US008824688B2

(12) United States Patent
Schreiner et al.

(10) Patent No.: US 8,824,688 B2

(45) Date of Patent: Sep. 2, 2014

(54) APPARATUS AND METHOD FOR GENERATING AUDIO OUTPUT SIGNALS USING OBJECT BASED METADATA

(75) Inventors: Stephan Schreiner, Buechenbach (DE); Wolfgang Fiesel, Schwanstetten (DE); Matthias Neusinger, Rohr (DE); Oliver Hellmuth, Erlangen (DE); Ralph Sperschneider, Ebermannstadt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/585,875

(22) Filed: Aug. 15, 2012

(65) Prior Publication Data

US 2012/0308049 A1 Dec. 6, 2012

Related U.S. Application Data

(63) Continuation of application No. 12/248,319, filed on Oct. 9, 2008.

(30) Foreign Application Priority Data

Jul. 17, 2008 (EP) .................................... 08012939

(51) Int. Cl.

*H04R 5/00* (2006.01)
*H04B 1/00* (2006.01)
*H04S 3/00* (2006.01)

(52) U.S. Cl.

CPC ..................................... *H04S 3/008* (2013.01)
USPC ................... 381/20; 381/1; 381/119; 700/94; 704/500

(58) Field of Classification Search

USPC ........ 381/1, 2, 17–23, 119; 700/500–502, 94; 369/1–12; 704/500–502
See application file for complete search history.

(56) References Cited

U.S. PATENT DOCUMENTS 5,479,564 A 12/1995 Vogten et al.
8,315,396 B2 11/2012 Schreiner et al.

(Continued)

FOREIGN PATENT DOCUMENTS

JP 2001-298680 A 10/2001
JP 2008-543227 A 11/2008

(Continued)

OTHER PUBLICATIONS

Schreiner et al.; "Apparatus and Method for Generating Audio Output Signals Using Object Based Metadata"; U.S. Appl. No. 12/248,319; filed Oct. 9, 2008.

(Continued)

*Primary Examiner* — Mark Tornow
*Assistant Examiner* — Eric Ward
(74) *Attorney, Agent, or Firm* — Keating & Bennett, LLP

(57) ABSTRACT

An apparatus for generating at least one audio output signal representing a superposition of at least two different audio objects comprises a processor for processing an audio input signal to provide an object representation of the audio input signal, where this object representation can be generated by a parametrically guided approximation of original objects using an object downmix signal. An object manipulator individually manipulates objects using audio object based metadata referring to the individual audio objects to obtain manipulated audio objects. The manipulated audio objects are mixed using an object mixer for finally obtaining an audio output signal having one or several channel signals depending on a specific rendering setup.

8 Claims, 14 Drawing Sheets

(56) References Cited

U.S. PATENT DOCUMENTS

| | | | | |
|---|---|---|---|---|
| 2006/0190247 | A1* | 8/2006 | Lindblom | 704/230 |
| 2007/0160218 | A1 | 7/2007 | Jakka et al. | |
| 2007/0239442 | A1 | 10/2007 | Hotho et al. | |
| 2008/0205671 | A1* | 8/2008 | Oh et al. | 381/119 |
| 2008/0269929 | A1* | 10/2008 | Oh et al. | 700/94 |
| 2009/0210238 | A1* | 8/2009 | Kim et al. | 704/500 |

FOREIGN PATENT DOCUMENTS

| | | | |
|---|---|---|---|
| JP | 2009-522894 | A | 6/2009 |
| RU | 2 382 419 | C2 | 2/2010 |
| TW | 200715901 | A | 4/2007 |
| TW | 200742275 | A | 11/2007 |
| WO | 2006/089570 | A1 | 8/2006 |
| WO | 2006/132857 | A2 | 12/2006 |
| WO | 2008/044901 | A1 | 4/2008 |
| WO | 2008/069593 | A1 | 6/2008 |

OTHER PUBLICATIONS

English translation of Official Communication issued in corresponding Korean Patent Application No. 10-2012-7026868, mailed on Dec. 17, 2012.

Official Communication issued in corresponding Russian Patent Application No. 2010150046, mailed on Dec. 10, 2012.

Official Communication issued in corresponding Taiwanese Patent Application No. 10220481720, mailed on Apr. 23, 2013.

* cited by examiner

| objekt ID | objekt audio file | objekt audio parameters energy and correlation |
|---|---|---|
| 1 | | matrix E for each subband and for each time block |
| 2 | | |
| 3 | | |
| ⋮ | ⋮ | |
| N | | |

FIGURE 6 object covariance matrix for a time block and a subband $$E = \begin{bmatrix} e_{11} & & & & & & & \\ e_{21} & e_{22} & & & & & & \\ e_{31} & e_{32} & e_{33} & & & & & \\ e_{41} & e_{42} & e_{43} & e_{44} & & & & \\ & & & & e_{55} & & & \\ \vdots & & & & & e_{66} & & \\ & & & & & & \ddots & \\ & & & & & & & e_{nn} \end{bmatrix}$$

$e_{ii}$: power of audio signals i in the corresponding subbabnd and time block $e_{ij}$: correlation measure between audio objects i,j in the corresponding subband and time block

FIGURE 7 downmixmatrix $$D = \begin{bmatrix} d_{11} & d_{12} & d_{13} & d_{14} \cdots d_{1N} \\ d_{21} & d_{22} & d_{23} & d_{24} \cdots d_{2N} \\ \vdots & & & \\ d_{K1} & & & \cdots d_{KN} \end{bmatrix}$$

$d_{ij}$ indicates, wether a portion or the whole object j is included in the object downmix signal i or not.

for example: $d_{12} = 0 \Rightarrow$ object 2 is NOT included in object donwmix signal 1

$d_{23} = 1 \Rightarrow$ object 3 is FULLY included in object donwmix signal 2

$d_{24} = d_{14} = 0{,}5$ $\Rightarrow$ object 4 is in both object downmix signals, but with half the energy in each object downmix signal

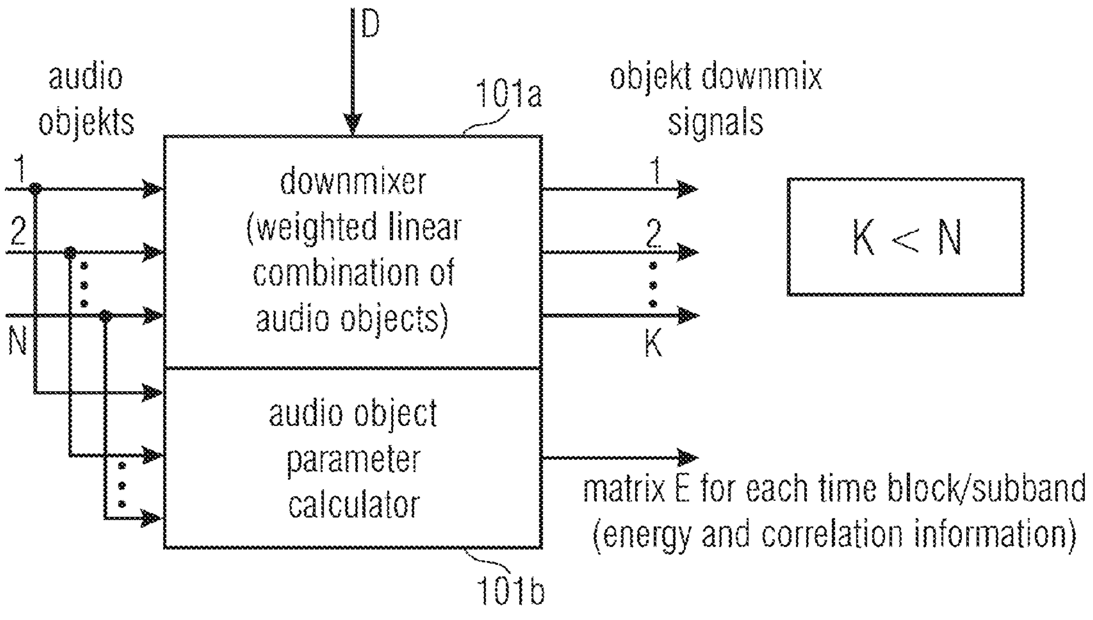

FIGURE 8 target
rendering matrix A (normally provided by user)

$$A = \begin{bmatrix} a_{11} & a_{12} & a_{13} & a_{14} & \cdots & a_{1N} \\ a_{21} & a_{22} & a_{23} & a_{24} & \cdots & a_{2N} \\ \vdots & & & & & \vdots \\ a_{M1} & \cdots & & & & a_{MN} \end{bmatrix}$$

M=2 for stereo rendering
M=M for M-channel rendering $a_{ij}$ indicates, wether a portion or the whole object is to be rendered in the output channel i or not

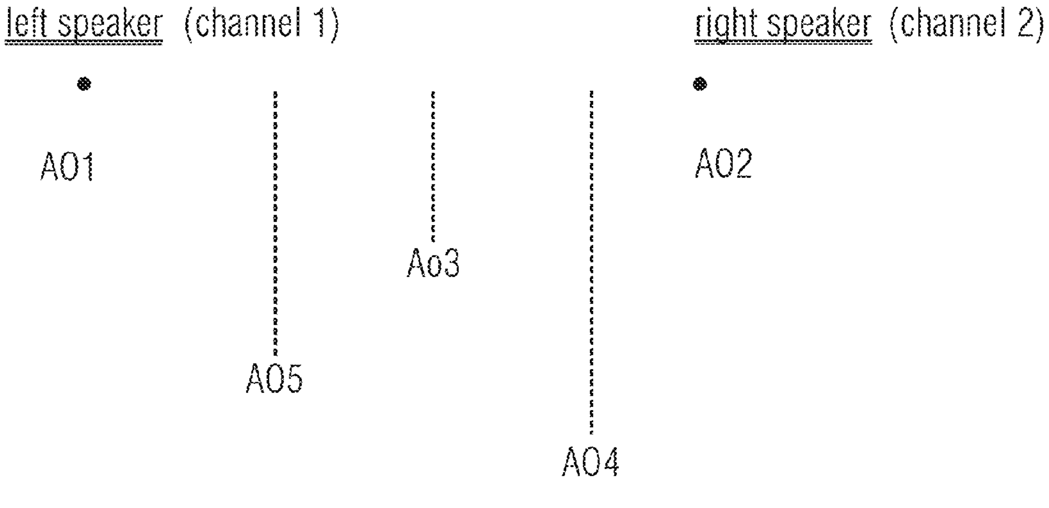

$$\text{exemplary matrix } A = \begin{bmatrix} 1 & 0 & 0.5 & 0.25 & 0.75 & 0 \\ 0 & 1 & 0.5 & 0.75 & 0.25 & 0 \end{bmatrix}$$

(object 6 is NOT to be rendered at all)

FIGURE 9

Sports in Television I - classical scenario

APPARATUS AND METHOD FOR GENERATING AUDIO OUTPUT SIGNALS USING OBJECT BASED METADATA

FIELD OF THE INVENTION

The present invention relates to audio processing and, particularly, to audio processing in the context of audio objects coding such as spatial audio object coding.

BACKGROUND OF THE INVENTION AND PRIOR ART

In modern broadcasting systems like television it is at certain circumstances desirable not to reproduce the audio tracks as the sound engineer designed them, but rather do perform special adjustments to address constraints given at rendering time. A well-known technology to control such post-production adjustments is to provide appropriate metadata along with those audio tracks.

Traditional sound reproduction systems, e.g. old home television systems, consist of one loudspeaker or a stereo pair of loudspeakers. More sophisticated multichannel reproduction systems use five or even more loudspeakers.

If multichannel reproduction systems are considered, sound engineers can be much more flexible in placing single sources in a two-dimensional plane and therefore may also use a higher dynamic range for their overall audio tracks, since voice intelligibility is much easier due to the well-known cocktail party effect.

However, those realistic, high dynamical sounds may cause problems on traditional reproduction systems. There may be scenarios where a consumer may not want this high dynamic signal, be it because she or he is listening to the content in a noisy environment (e.g. in a driving car or with an in-flight or mobile entertainment system), she or he is wearing hearing aids or she or he does not want to disturb her or his neighbors (late at night for example).

Furthermore, broadcasters face the problem that different items in one program (e.g. commercials) may be at different loudness levels due to different crest factors requiring level adjustment of consecutive items.

In a classical broadcast transmission chain the end user receives the already mixed audio track. Any further manipulation on receiver side may be done only in a very limited form. Currently a small feature set of Dolby metadata allows the user to modify some property of the audio signal.

Usually, manipulations based on the above mentioned metadata is applied without any frequency selective distinction, since the metadata traditionally attached to the audio signal does not provide sufficient information to do so.

Furthermore, only the whole audio stream itself can be manipulated. Additionally, there is no way to adopt and separate each audio object inside this audio stream. Especially in improper listening environments, this may be unsatisfactory.

In the midnight mode, it is impossible for the current audio processor to distinguish between ambience noises and dialog because of missing guiding information. Therefore, in case of high level noises (which must be compressed/limited in loudness), also dialogs will be manipulated in parallel. This might be harmful for speech intelligibility.

Increasing the dialog level compared to the ambient sound helps to improve the perception of speech specially for hearing impaired people. This technique only works if the audio signal is really separated in dialog and ambient components on the receiver side in addition with property control information. If only a stereo downmix signal is available no further separation can be applied anymore to distinguish and manipulate the speech information separately.

Current downmix solutions allow a dynamic stereo level tuning for center and surround channels. But for any variant loudspeaker configuration instead of stereo there is no real description from the transmitter how to downmix the final multi-channel audio source. Only a default formula inside the decoder performs the signal mix in a very inflexible way.

In all described scenarios, generally two different approaches exist. The first approach is that, when generating the audio signal to be transmitted, a set of audio objects is downmixed into a mono, stereo or a multichannel signal. This signal which is to be transmitted to a user of this signal via broadcast, via any other transmission protocol or via distribution on a computer-readable storage medium normally has a number of channels which is smaller than the number of original audio objects which were downmixed by a sound engineer for example in a studio environment. Furthermore, metadata can be attached in order to allow several different modifications, but these modifications can only be applied to the whole transmitted signal or, if the transmitted signal has several different transmitted channels, to individual transmitted channels as a whole. Since, however, such transmitted channels are always superpositions of several audio objects, an individual manipulation of a certain audio object, while a further audio object is not manipulated is not possible at all.

The other approach is to not perform the object downmix, but to transmit the audio object signals as they are as separate transmitted channels. Such a scenario works well, when the number of audio objects is small. When, for example, only five audio objects exist, then it is possible to transmit these five different audio objects separately from each other within a 5.1 scenario. Metadata can be associated with these channels which indicate the specific nature of an object/channel. Then, on the receiver side, the transmitted channels can be manipulated based on the transmitted metadata.

A disadvantage of this approach is that it is not backward-compatible and does only work well in the context of a small number of audio objects. When the number of audio objects increases, the bitrate required for transmitting all objects as separate explicit audio tracks rapidly increases. This increasing bitrate is specifically not useful in the context of broadcast applications.

Therefore current bitrate efficient approaches do not allow an individual manipulation of distinct audio objects. Such an individual manipulation is only allowed when one would transmit each object separately. This approach, however, is not bitrate efficient and is, therefore, not feasible specifically in broadcast scenarios.

It is an object of the present invention to provide a bitrate efficient but flexible solution to these problems.

In accordance with the first aspect of the present invention this object is achieved by Apparatus for generating at least one audio output signal representing a superposition of at least two different audio objects, comprising: a processor for processing an audio input signal to provide an object representation of the audio input signal, in which the at least two different audio objects are separated from each other, the at least two different audio objects are available as separate audio object signals, and the at least two different audio objects are manipulatable independently from each other; an object manipulator for manipulating the audio object signal or a mixed audio object signal of at least one audio object based on audio object based metadata referring to the at least one audio object to obtain a manipulated audio object signal or a manipulated mixed audio object signal for the at least one audio object; and an object mixer for mixing the object representation by combining the manipulated audio object with an unmodified audio object or with a manipulated different audio object manipulated in a different way as the at least one audio object.

In accordance with a second aspect of the present invention, this object is achieved by this Method of generating at least one audio output signal representing a superposition of at least two different audio objects, comprising: processing an audio input signal to provide an object representation of the audio input signal, in which the at least two different audio objects are separated from each other, the at least two different audio objects are available as separate audio object signals, and the at least two different audio objects are manipulatable independently from each other; manipulating the audio object signal or a mixed audio object signal of at least one audio object based on audio object based metadata referring to the at least one audio object to obtain a manipulated audio object signal or a manipulated mixed audio object signal for the at least one audio object; and mixing the object representation by combining the manipulated audio object with an unmodified audio object or with a manipulated different audio object manipulated in a different way as the at least one audio object.

In accordance with a third aspect of the present invention, this object is achieved by an apparatus for generating an encoded audio signal representing a superposition of at least two different audio objects, comprising: a data stream formatter for formatting a data stream so that the data stream comprises an object downmix signal representing a combination of the at least two different audio objects, and, as side information, metadata referring to at least one of the different audio objects.

In accordance with a fourth aspect of the present invention, this object is achieved by a method of generating an encoded audio signal representing a superposition of at least two different audio objects, comprising: formatting a data stream so that the data stream comprises an object downmix signal representing a combination of the at least two different audio objects, and, as side information, metadata referring to at least one of the different audio objects.

Further aspects of the present invention refer to computer programs implementing the inventive methods and a computer-readable storage medium having stored thereon an object downmix signal and, as side information, object parameter data and metadata for one or more audio objects included in the object downmix signal.

The present invention is based on the finding that an individual manipulation of separate audio object signals or separate sets of mixed audio object signals allows an individual object-related processing based on object-related metadata. In accordance with the present invention, the result of the manipulation is not directly output to a loudspeaker, but is provided to an object mixer, which generates output signals for a certain rendering scenario, where the output signals are generated by a superposition of at least one manipulated object signal or a set of mixed object signals together with other manipulated object signals and/or an unmodified object signal. Naturally, it is not necessary to manipulate each object, but, in some instances, it can be sufficient to only manipulate one object and to not manipulate a further object of the plurality of audio objects. The result of the object mixing operation is one or a plurality of audio output signals, which are based on manipulated objects. These audio output signals can be transmitted to loudspeakers or can be stored for further use or can even be transmitted to a further receiver depending on the specific application scenario.

Preferably, the signal input into the inventive manipulation/mixing device is a downmix signal generated by downmixing a plurality of audio object signals. The downmix operation can be meta-data controlled for each object individually or can be uncontrolled such as be the same for each object. In the former case, the manipulation of the object in accordance with the metadata is the object controlled individual and object-specific upmix operation, in which a speaker component signal representing this object is generated. Preferably, spatial object parameters are provided as well, which can be used for reconstructing the original signals by approximated versions thereof using the transmitted object downmix signal. Then, the processor for processing an audio input signal to provide an object representation of the audio input signal is operative to calculate reconstructed versions of the original audio object based on the parametric data, where these approximated object signals can then be individually manipulated by object-based metadata.

Preferably, object rendering information is provided as well, where the object rendering information includes information on the intended audio reproduction setup and information on the positioning of the individual audio objects within the reproduction scenario. Specific embodiments, however, can also work without such object-location data. Such configurations are, for example, the provision of stationary object positions, which can be fixedly set or which can be negotiated between a transmitter and a receiver for a complete audio track.

BRIEF DESCRIPTION OF THE DRAWINGS

Preferred embodiments of the present invention are subsequently discussed in the context of the enclosed figures, in which:

FIG. 6 illustrates a map indicating several audio objects identified by a certain ID, having an object audio file, and a joint audio object information matrix E;

FIG. 7 illustrates an explanation of an object covariance matrix E of FIG. 6:

FIG. 8 illustrates a downmix matrix and an audio object encoder controlled by the downmix matrix D;

FIG. 9 illustrates a target rendering matrix A which is normally provided by a user and an example for a specific target rendering scenario;

DETAILED DESCRIPTION OF THE PREFERRED EMBODIMENTS

Figure 1:
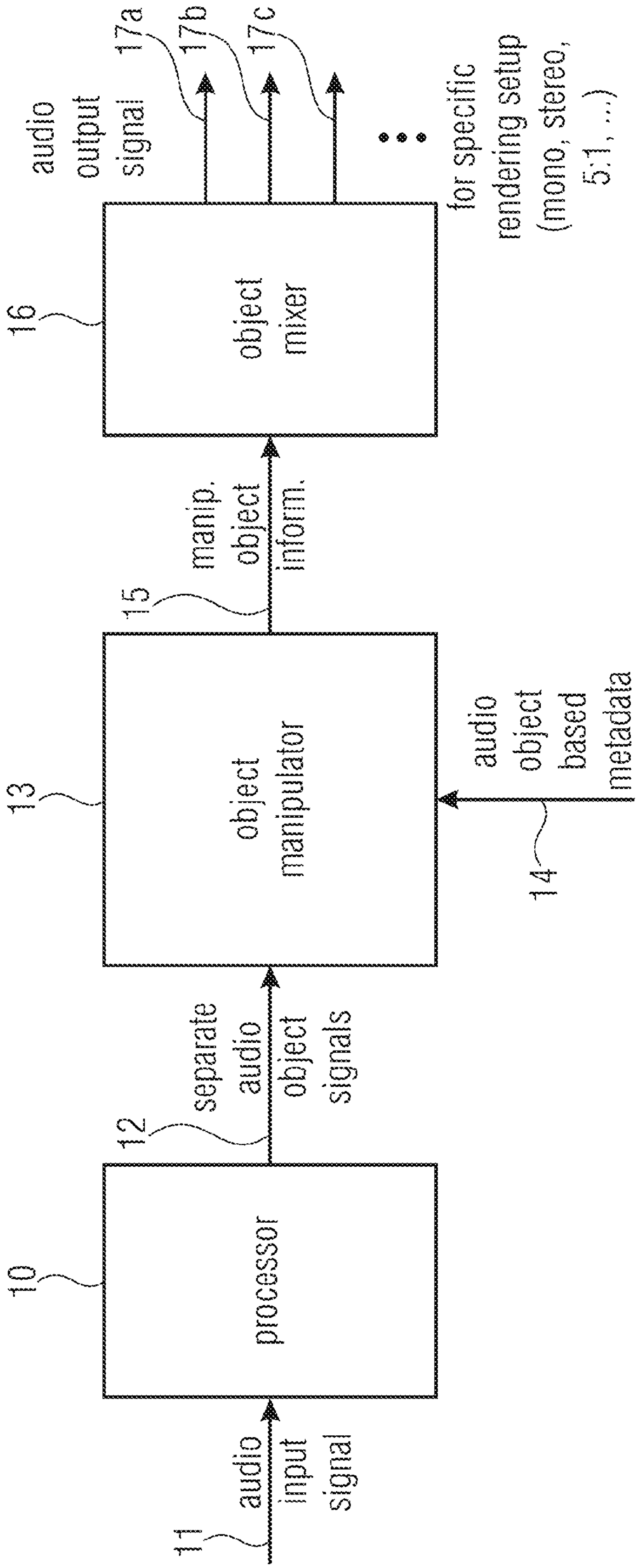
FIG. 1 illustrates a preferred embodiment of an apparatus for generating at least one audio output signal.

To face the above mentioned problems, a preferred approach is to provide appropriate metadata along with those audio tracks. Such metadata may consist of information to control the following three factors (the three "classical" D's):

dialog normalization dynamic range control downmix

Such Audio metadata helps the receiver to manipulate the received audio signal based on the adjustments performed by a listener. To distinguish this kind of audio metadata from others (e.g. descriptive metadata like Author, Title, . . . ), it is usually referred to as "Dolby Metadata" (because they are yet only implemented by Dolby). Subsequently, only this kind of Audio metadata is considered and is simply called metadata.

Audio metadata is additional control information that is carried along with the audio program and has essential information about the audio to a receiver. Metadata provides many important functions including dynamic range control for less-than-ideal listening environments, level matching between programs, downmixing information for the reproduction of multichannel audio through fewer speaker channels, and other information.

Metadata provides the tools necessary for audio programs to be reproduced accurately and artistically in many different listening situations from full-blown home theaters to in-flight entertainment, regardless of the number of speaker channels, quality of playback equipment, or relative ambient noise level.

While an engineer or content producer takes great care in providing the highest quality audio possible within their program, she or he has no control over the vast array of consumer electronics or listening environments that will attempt to reproduce the original soundtrack. Metadata provides the engineer or content producer greater control over how their work is reproduced and enjoyed in almost every conceivable listening environment.

Dolby Metadata is a special format to provide information to control the three factors mentioned.

The three most important Dolby metadata functionalities are:

Dialogue Normalization to achieve a long-term average level of dialogue within a presentation, frequently consisting of different program types, such as feature film, commercials, etc.

Dynamic Range Control to satisfy most of the audience with pleasing audio compression but at the same time allow each individual customer to control the dynamics of the audio signal and adjust the compression to her or his personal listening environment.

Downmix to map the sounds of a multichannel audio signal to two or one channels in case no multichannel audio playback equipment is available.

Dolby metadata are used along with Dolby Digital (AC-3) and Dolby E. The Dolby-E Audio metadata format is described in [16] Dolby Digital (AC-3) is intended for the translation of audio into the home through digital television broadcast (either high or standard definition), DVD or other media.

Dolby Digital can carry anything from a single channel of audio up to a full 5.1-channel program, including metadata. In both digital television and DVD, it is commonly used for the transmission of stereo as well as full 5.1 discrete audio programs.

Dolby E is specifically intended for the distribution of multichannel audio within professional production and distribution environments. Any time prior to delivery to the consumer, Dolby E is the preferred method for distribution of multichannel/multiprogram audio with video. Dolby E can carry up to eight discrete audio channels configured into any number of individual program configurations (including metadata for each) within an existing two-channel digital audio infrastructure. Unlike Dolby Digital, Dolby E can handle many encode/decode generations, and is synchronous with the video frame rate. Like Dolby Digital, Dolby E carries metadata for each individual audio program encoded within the data stream. The use of Dolby E allows the resulting audio data stream to be decoded, modified, and re-encoded with no audible degradation. As the Dolby E stream is synchronous to the video frame rate, it can be routed, switched, and edited in a professional broadcast environment.

Apart from this means are provided along with MPEG AAC to perform dynamic range control and to control the downmix generation.

In order to handle source material with variable peak levels, mean levels and dynamic range in a manner that minimizes the variability for the consumer, it is necessary to control the reproduced level such that, for instance, dialogue level or mean music level is set to a consumer controlled level at reproduction, regardless of how the program was originated. Additionally, not all consumers will be able to listen to the programs in a good (i.e. low noise) environment, with no constraint on how loud they make the sound. The car environment, for instance, has a high ambient noise level and it can therefore be expected that the listener will want to reduce the range of levels that would otherwise be reproduced.

For both of these reasons, dynamic range control has to be available within the specification of AAC. To achieve this, it is necessary to accompany the bit-rate reduced audio with data used to set and control the dynamic range of the program items. This control has to be specified relative to a reference level and in relationship to the important program elements, e.g. the dialogue.

The features of the dynamic range control are as follows:

1. Dynamic Range Control is entirely optional. Therefore, with correct syntax, there is no change in complexity for those not wishing to invoke DRC.
2. The bit-rate reduced audio data is transmitted with the full dynamic range of the source material, with supporting data to assist in dynamic range control.
3. The dynamic range control data can be sent every frame to reduce to a minimum the latency in setting replay gains.
4. The dynamic range control data is sent using the "fill element" feature of AAC.
5. The Reference Level is defined as Full-scale.
6. The Program Reference Level is transmitted to permit level parity between the replay levels of different sources and to provide a reference about which the dynamic range control may be applied. It is that feature of the source signal that is most relevant to the subjective impression of the loudness of a program, such as the level of the dialogue content of a program or the average level of a music program.
7. The Program Reference Level represents that level of program that may be reproduced at a set level relative to the Reference Level in the consumer hardware to achieve replay level parity. Relative to this, the quieter portions of the program may be increased in level and the louder portions of the program may be reduced in level.

8. Program Reference Level is specified within the range 0 to −31.75 dB relative to Reference Level.
9. Program Reference Level uses a 7 bit filed with 0.25 dB steps.
10. The dynamic range control is specified within the range ±31.75 dB.
11. The dynamic range control uses an 8 bit field (1 sign, 7 magnitude) with 0.25 dB steps.
12. The dynamic range control can be applied to all of an audio channel's spectral coefficients or frequency bands as a single entity or the coefficients can be split into different scalefactor bands, each being controlled separately by separate sets of dynamic range control data.
13. The dynamic range control can be applied to all channels (of a stereo or multichannel bitstream) as a single entity or can be split, with sets of channels being controlled separately by separate sets of dynamic range control data.
14. If an expected set of dynamic range control data is missing, the most recently received valid values should be used.
15. Not all elements of the dynamic range control data are sent every time. For instance, Program Reference Level may only be sent on average once every 200 ms.
16. Where necessary, error detection/protection is provided by the Transport Layer.
17. The user shall be given the means to alter the amount of dynamic range control, present in the bitstream, that is applied to the level of the signal.

Besides the possibility to transmit separate mono or stereo mixdown channels in a 5.1-channel transmission, AAC also allows a automatic mixdown generation from the 5-channel source track. The LFE channel shall be omitted in this case.

This matrix mixdown method may be controlled by the editor of an audio track with a small set of parameters defining the amount of the rear channels added to mixdown.

The matrix-mixdown method applies only for mixing a 3-front/2-back speaker configuration, 5-channel program, down to stereo or a mono program. It is not applicable to any program with other than the 3/2 configuration.

Within MPEG several means are provided to control the Audio rendering on the receiver side.

A generic technology is provided by a scene description language, e.g. BIFS and LASeR. Both technologies are used for rendering audio-visual elements from separated coded objects into a playback scene.

BIFS is standardized in [5] and LASeR in [6].

MPEG-D mainly deals with (parametric) descriptions (i.e. metadata)

- to generate multichannel Audio based on downmixed Audio representations (MPEG Surround); and
- to generate MPEG Surround parameters based on Audio objects (MPEG Spatial Audio Object Coding)

MPEG Surround exploits inter-channel differences in level, phase and coherence equivalent to the ILD, ITD and IC cues to capture the spatial image of a multichannel audio signal relative to a transmitted downmix signal and encodes these cues in a very compact form such that the cues and the transmitted signal can be decoded to synthesize a high quality multi-channel representation. The MPEG Surround encoder receives a multi-channel audio signal, where N is the number of input channels (e.g. 5.1). A key aspect of the encoding process is that a downmix signal, xt1 and xt2, which is typically stereo (but could also be mono), is derived from the multi-channel input signal, and it is this downmix signal that is compressed for transmission over the channel rather than the multi-channel signal. The encoder may be able to exploit the downmix process to advantage, such that it creates a faithful equivalent of the multi-channel signal in the mono or stereo downmix, and also creates the best possible multi-channel decoding based on the downmix and encoded spatial cues. Alternatively, the downmix could be supplied externally. The MPEG Surround encoding process is agnostic to the compression algorithm used for the transmitted channels; it could be any of a number of high-performance compression algorithms such as MPEG-1 Layer III, MPEG-4 AAC or MPEG-4 High Efficiency AAC, or it could even be PCM.

The MPEG surround technology supports very efficient parametric coding of multichannel audio signals. The idea of MPEG SAOC is to apply similar basic assumptions together with a similar parameter representation for very efficient parametric coding of individual audio objects (tracks). Additionally, a rendering functionality is included to interactively render the audio objects into an acoustical scene for several types of reproduction systems (1.0, 2.0, 5.0, . . . for loudspeakers or binaural for headphones). SAOC is designed to transmit a number of audio objects in a joint mono or stereo downmix signal to later allow a reproduction of the individual objects in an interactively rendered audio scene. For this purpose, SAOC encodes Object Level Differences (OLD), Inter-Object Cross Coherences (IOC) and Downmix Channel Level Differences (DCLD) into a parameter bitstream. The SAOC decoder converts the SAOC parameter representation into an MPEG Surround parameter representation, which is then decoded together with the downmix signal by an MPEG Surround decoder to produce the desired audio scene. The user interactively controls this process to alter the representation of the audio objects in the resulting audio scene. Among the numerous conceivable applications for SAOC, a few typical scenarios are listed in the following.

Consumers can create personal interactive remixes using a virtual mixing desk. Certain instruments can be, e.g., attenuated for playing along (like Karaoke), the original mix can be modified to suit personal taste, the dialog level in movies/broadcasts can be adjusted for better speech intelligibility etc.

For interactive gaming, SAOC is a storage and computationally efficient way of reproducing sound tracks. Moving around in the virtual scene is reflected by an adaptation of the object rendering parameters. Networked multi-player games benefit from the transmission efficiency using one SAOC stream to represent all sound objects that are external to a certain player's terminal.

In the context of this application, the term "audio object" also comprises a "stem" known in sound production scenarios. Particularly, stems are the individual components of a mix, separately saved (usually to disc) for the purposes of use in a remix. Related stems are typically bounced from the same original location. Examples could be a drum stem (includes all related drum instruments in a mix), a vocal stem (includes only the vocal tracks) or a rhythm stem (includes all rhythm related instruments such as drums, guitar, keyboard, . . . ).

Current telecommunication infrastructure is monophonic and can be extended in its functionality. Terminals equipped with an SAOC extension pick up several sound sources (objects) and produce a monophonic downmix signal, which is transmitted in a compatible way by using the existing (speech) coders. The side information can be conveyed in an embedded, backward compatible way. Legacy terminals will continue to produce monophonic output while SAOC-enabled ones can render an acoustic scene and thus increase intelligibility by spatially separating the different speakers ("cocktail party effect").

On overview of actual available Dolby audio metadata applications describes the following section:

Midnight Mode

As mentioned in section [0005], there may scenarios, where the listener may not want a high dynamic signal. Therefore, she or he may activate the so called "midnight mode" of her or his receiver. Then, a compressor is applied on the total audio signal. To control the parameters of this compressor, transmitted metadata are evaluated and applied to the total audio signal.

Clean Audio

Another scenario are hearing impaired people, who do not want to have high dynamic ambience noise, but who want to have a quite clean signal containing dialogs. ("CleanAudio"). This mode may also be enabled using metadata.

A currently proposed solution is defined in [15]—Annex E. The balance between the stereo main signal and the additional mono dialog description channel is handled here by an individual level parameter set. The proposed solution based on a separate syntax is called supplementary audio service in DVB.

Downmix

There are separate metadata parameters that govern the L/R downmix. Certain metadata parameters allow the engineer to select how the stereo downmix is constructed and which stereo analog signal is preferred. Here the center and the surround downmix level define the final mixing balance of the downmix signal for every decoder.

FIG. 1 illustrates an apparatus for generating at least one audio output signal representing a superposition of at least two different audio objects in accordance with a preferred embodiment of the present invention. The apparatus of FIG. 1 comprises a processor 10 for processing an audio input signal 11 to provide an object representation 12 of the audio input signal, in which the at least two different audio objects are separated from each other, in which the at least two different audio objects are available as separate audio object signals and in which the at least two different audio objects are manipulatable independently from each other.

The manipulation of the object representation is performed in an object manipulator 13 for manipulating the audio object signal or a mixed representation of the audio object signal of at least one audio object based on audio object based metadata 14 referring to the at least one audio object. The audio object manipulator 13 is adapted to obtain a manipulated audio object signal or a manipulated mixed audio object signal representation 15 for the at least one audio object.

The signals generated by the object manipulator are input into an object mixer 16 for mixing the object representation by combining the manipulated audio object with an unmodified audio object or with a manipulated different audio object where the manipulated different audio object has been manipulated in a different way as the at least one audio object. The result of the object mixer comprises one or more audio output signals 17*a*, 17*b*, 17*c*. Preferably, the one or more output signals 17*a* to 17*c* are designed for a specific rendering setup such as a mono rendering setup, a stereo rendering setup, a multi-channel rendering setup comprising three or more channels such as a surround-setup requiring at least five or at least seven different audio output signals.

Figure 2:
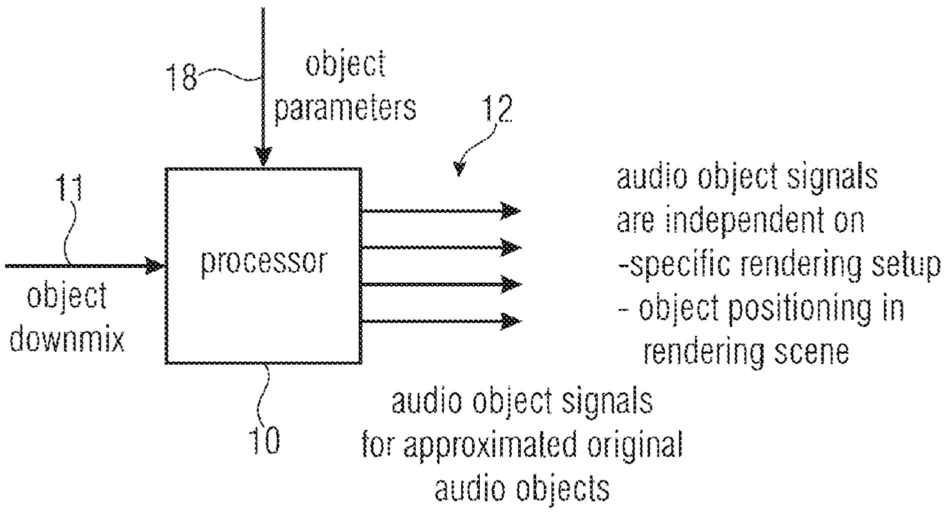
FIG. 2 illustrates a preferred implementation of the processor of FIG. 1.

FIG. 2 illustrates a preferred implementation of the processor 10 for processing the audio input signal. Preferably, the audio input signal 11 is implemented as an object downmix 11 as obtained by an object downmixer 101*a* of FIG. 5*a* which is described later. In this situation, the processor additionally receives object parameters 18 as, for example, generated by object parameter calculator 101*b* in FIG. 5*a* as described later. Then, the processor 10 is in the position to calculate separate audio object signals 12. The number of audio object signals 12 can be higher than the number of channels in the object downmix 11. The object downmix 11 can include a mono downmix, a stereo downmix or even a downmix having more than two channels. However, the processor 12 can be operative to generate more audio object signals 12 compared to the number of individual signals in the object downmix 11. The audio object signals are, due to the parametric processing performed by the processor 10, not a true reproduction of the original audio objects which were present before the object downmix 11 was performed, but the audio object signals are approximated versions of the original audio objects, where the accuracy of the approximation depends on the kind of separation algorithm performed in the processor 10 and, of course, on the accuracy of the transmitted parameters. Preferred object parameters are the parameters known from spatial audio object coding and a preferred reconstruction algorithm for generating the individually separated audio object signals is the reconstruction algorithm performed in accordance with the spatial audio object coding standard. A preferred embodiment of the processor 10 and the object parameters is subsequently discussed in the context of FIGS. 6 to 9.

Figure 3A:
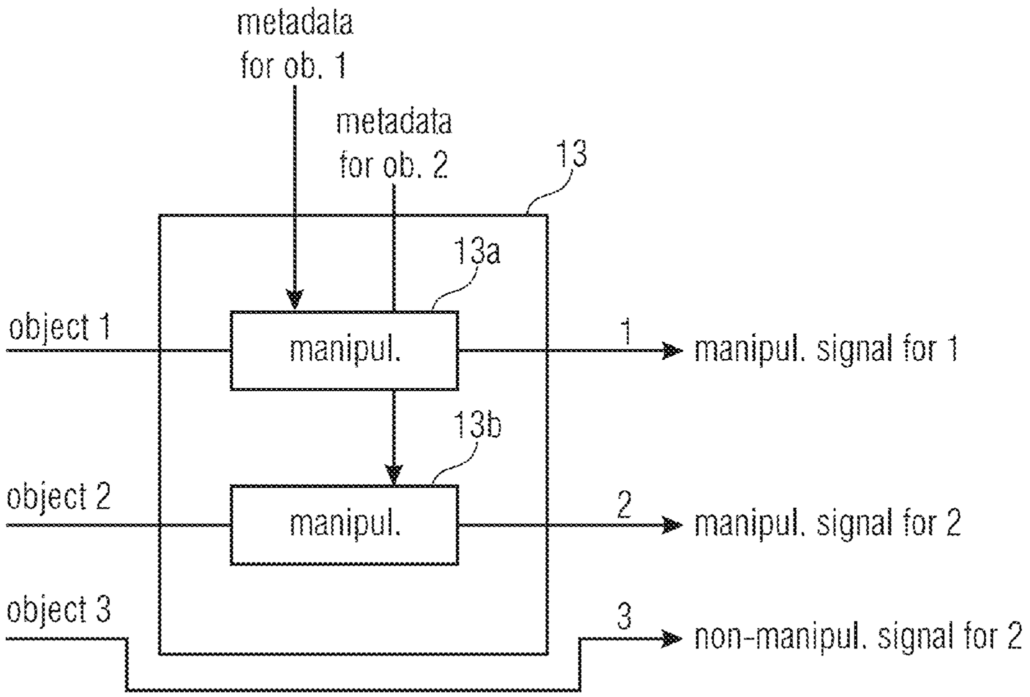
FIG. 3*a* illustrates a preferred embodiment of the manipulator for manipulating object signals.
Figure 3B:
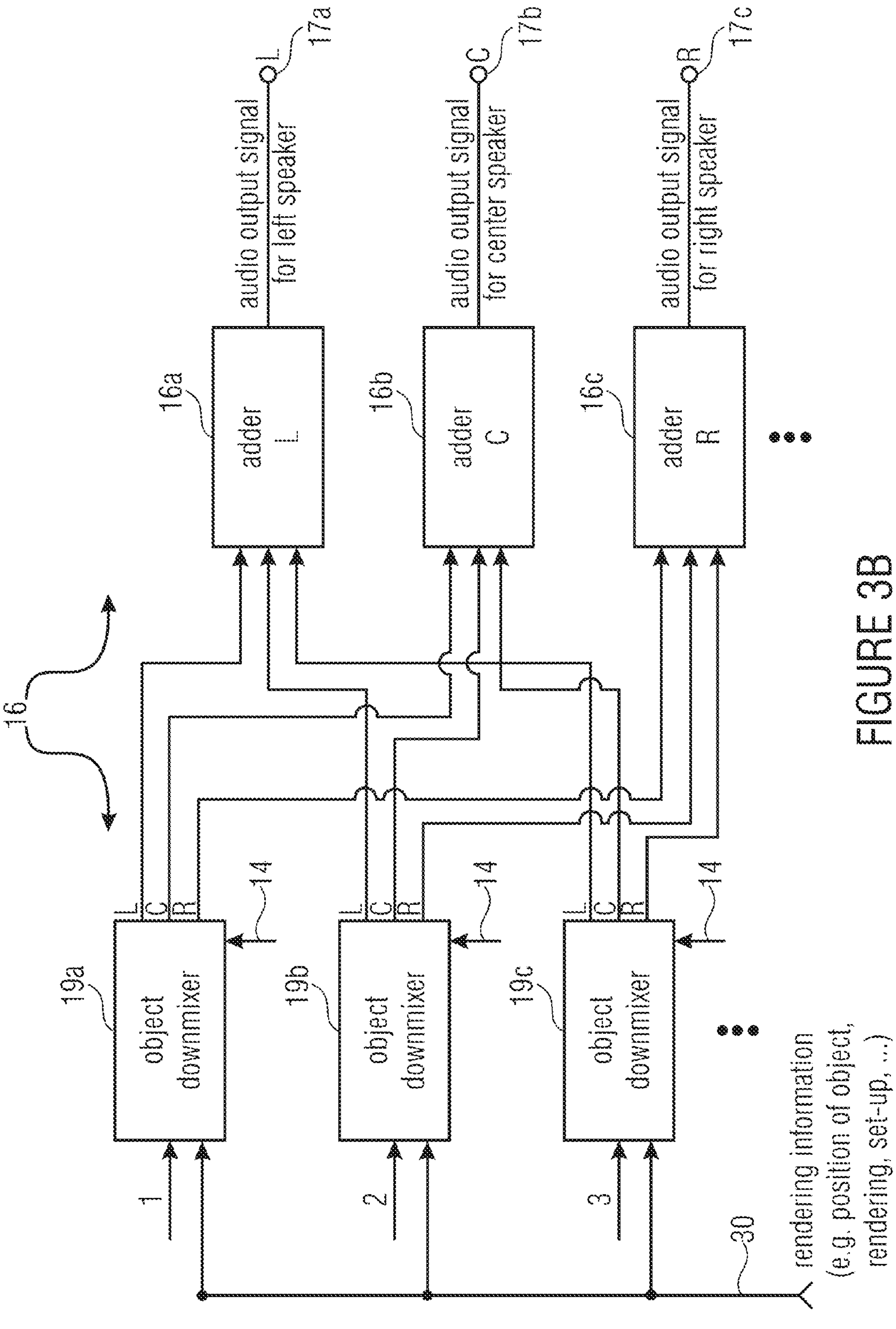
FIG. 3*b* illustrates a preferred implementation of the object mixer in the context of a manipulator as illustrated in FIG. 3*a;*
Figure 4:
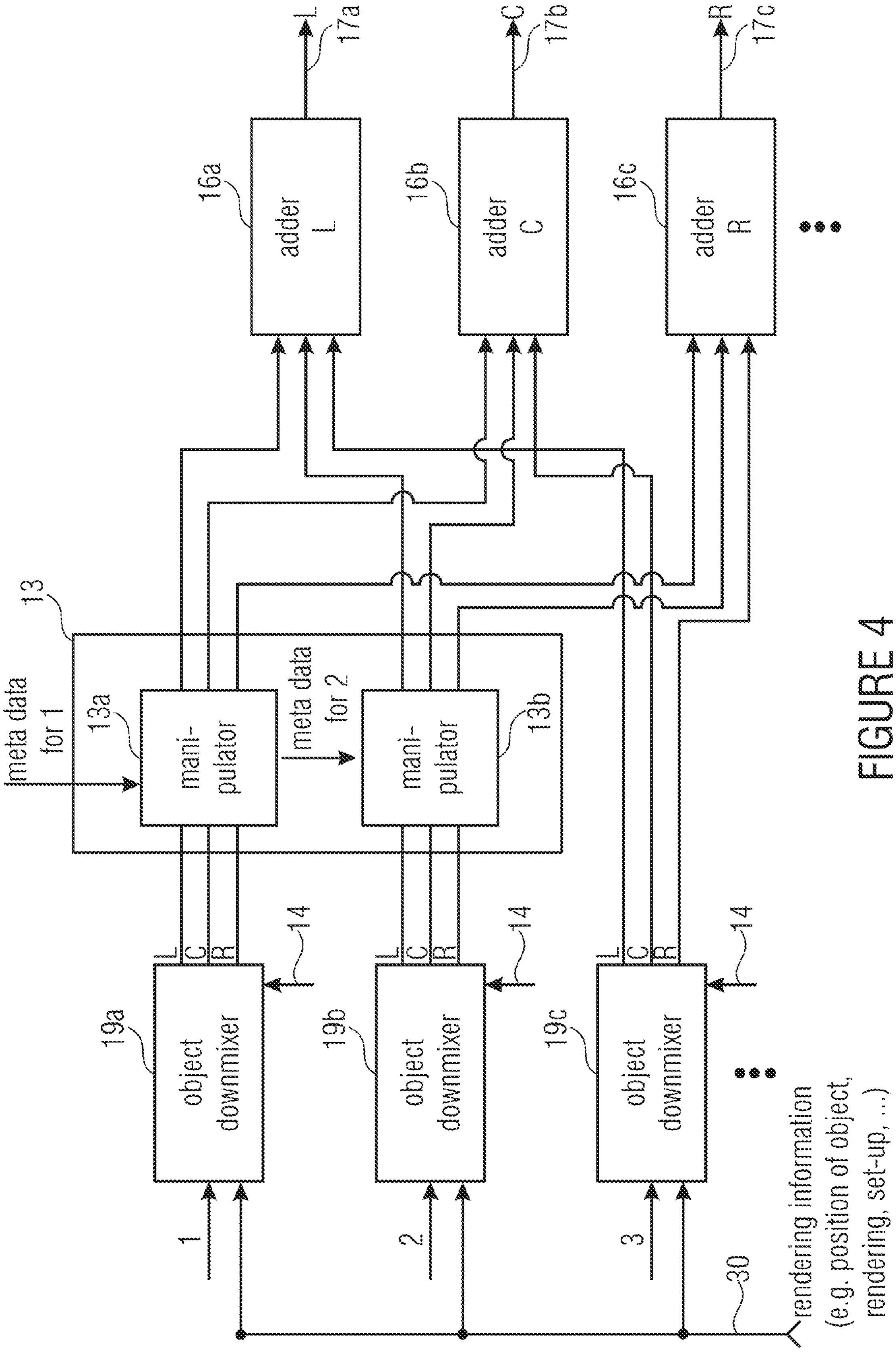
FIG. 4 illustrates a processor/manipulator/object mixer configuration in a situation, in which the manipulation is performed subsequent to an object downmix, but before a final object mix.

FIG. 3*a* and FIG. 3*b* collectively illustrate an implementation, in which the object manipulation is performed before an object downmix to the reproduction setup, while FIG. 4 illustrates a further implementation, in which the object downmix is performed before manipulation, and the manipulation is performed before the final object mixing operation. The result of the procedure in FIG. 3*a*, 3*b* compared to FIG. 4 is the same, but the object manipulation is performed at different levels in the processing scenario. When the manipulation of the audio object signals is an issue in the context of efficiency and computational resources, the FIG. 3*a*/3*b* embodiment is preferred, since the audio signal manipulation has to be performed only on a single audio signal rather than a plurality of audio signals as in FIG. 4. In a different implementation in which there might be a requirement that the object downmix has to be performed using an unmodified object signal, the configuration of FIG. 4 is preferred, in which the manipulation is performed subsequent to the object downmix, but before the final object mix to obtain the output signals for, for example, the left channel L, the center channel C or the right channel R.

FIG. 3*a* illustrates the situation, in which the processor 10 of FIG. 2 outputs separate audio object signals. At least one audio object signal such as the signal for object 1 is manipulated in a manipulator 13*a* based on metadata for this object 1. Depending on the implementation, other objects such as object 2 is manipulated as well by a manipulator 13*b*. Naturally, the situation can arise that there actually exist an object such as object 3, which is not manipulated but which is nevertheless generated by the object separation. The result of the FIG. 3*a* processing are, in the FIG. 3*a* example, two manipulated object signals and one non-manipulated signal.

These results are input into the object mixer 16, which includes a first mixer stage implemented as object downmixers 19*a*, 19*b*, 19*c*, and which furthermore comprises a second object mixer stage implemented by devices 16*a*, 16*b*, 16*c*.

The first stage of the object mixer 16 includes, for each output of FIG. 3*a*, an object downmixer such as object downmixer 19*a* for output 1 of FIG. 3*a*, object downmixer 19*b* for output 2 of FIG. 3*a* an object downmixer 19*c* for output 3 of FIG. 3*a*. The purpose of the object downmixer 19*a* to 19*c* is to "distribute" each object to the output channels. Therefore, each object downmixer 19*a*, 19*b*, 19*c* has an output for a left component signal L, a center component signal C and a right component signal R. Thus, if for example object 1 would be the single object, downmixer 19*a* would be a straight-forward downmixer and the output of block 19*a* would be the same as the final output L, C, R indicated at 17*a*, 17*b*, 17*c*. The object downmixers 19*a* to 19*c* preferably receive rendering information indicated at 30, where the rendering information may describe the rendering setup, i.e., as in the FIG. 3*e* embodiment only three output speakers exist. These outputs are a left speaker L, a center speaker C and a right speaker R. If, for example, the rendering setup or reproduction setup comprises a 5.1 scenario, then each object downmixer would have six output channels, and there would exist six adders so that a final output signal for the left channel, a final output signal for the right channel, a final output signal for the center channel, a final output signal for the left surround channel, a final output signal for the right surround channel and a final output signal for the low frequency enhancement (sub-woofer) channel would be obtained.

Specifically, the adders 16*a*, 16*b*, 16*c* are adapted to combine the component signals for the respective channel, which were generated by the corresponding object downmixers. This combination preferably is a straight-forward sample by sample addition, but, depending on the implementation, weighting factors can be applied as well. Furthermore the functionalities in FIGS. 3*a*, 3*b* can be performed in the frequency or subband domain so that elements 19*a* to 16*c* might operate in the frequency domain and there would be some kind of frequency/time conversion before actually outputting the signals to speakers in a reproduction set-up.

FIG. 4 illustrates an alternative implementation, in which the functionalities of the elements 19*a*, 19*b*, 19*c*, 16*a*, 16*b*, 16*c* are similar to the FIG. 3*b* embodiment. Importantly, however, the manipulation which took place in FIG. 3*a* before the object downmix 19*a* now takes place subsequent to the object downmix 19*a*. Thus, the object-specific manipulation which is controlled by the metadata for the respective object is done in the downmix domain, i.e., before the actual addition of the then manipulated component signals. When FIG. 4 is compared to FIG. 1, it becomes clear that the object downmixer as 19*a*, 19*b*, 19*c* will be implemented within the processor 10, and the object mixer 16 will comprise the adders 16*a*, 16*b*, 16*c*. When FIG. 4 is implemented and the object downmixers are part of the processor, then the processor will receive, in addition to the object parameters 18 of FIG. 1, the rendering information 30, i.e. information on the position of each audio object and information on the rendering setup and additional information as the case may be.

Furthermore, the manipulation can include the downmix operation implemented by blocks 19*a*, 19*b*, 19*c*. In this embodiment, the manipulator includes these blocks, and additional manipulations can take place, but are not required in any case.

Figure 5A:
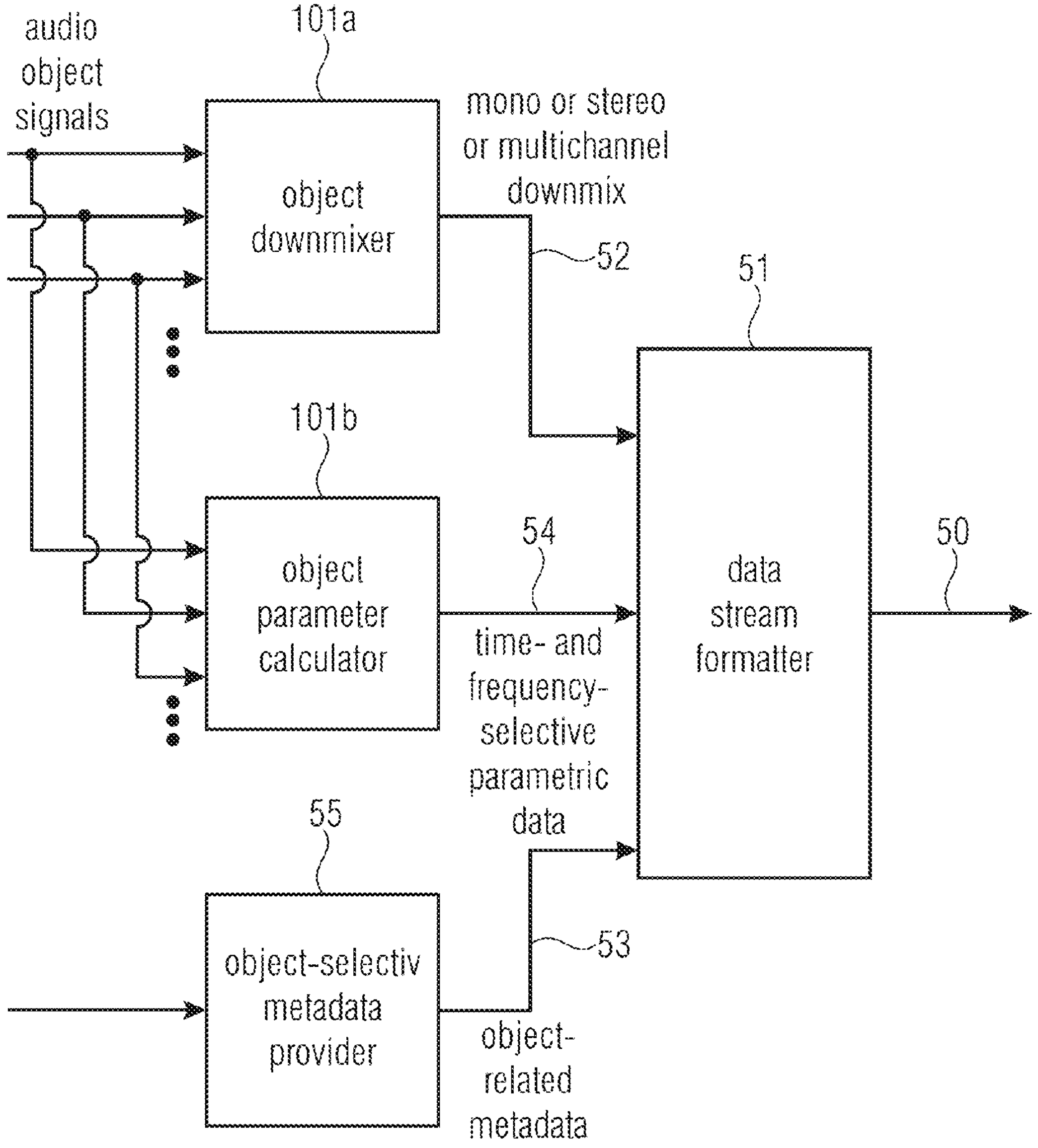
FIG. 5*a* illustrates a preferred embodiment of an apparatus for generating an encoded audio signal.
Figure 5B:
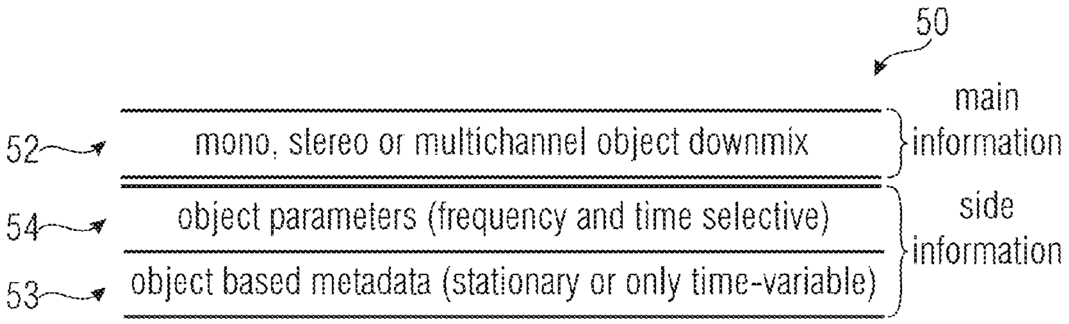
FIG. 5*b* illustrates a transmission signal having an object downmix, object based metadata, and spatial object parameters.

FIG. 5*a* illustrates an encoder-side embodiment which can generate a data stream as schematically illustrated in FIG. 5*b*. Specifically, FIG. 5*a* illustrates an apparatus for generating an encoded audio signal 50, representing a super position of at least two different audio objects. Basically, the apparatus of FIG. 5*a* illustrates a data stream formatter 51 for formatting the data stream 50 so that the data stream comprises an object downmix signal 52, representing a combination such as a weighted or unweighted combination of the at least two audio objects. Furthermore, the data stream 50 comprises, as side information, object related metadata 53 referring to at least one of the different audio objects. Preferably, the data stream 50 furthermore comprises parametric data 54, which are time and frequency selective and which allow a high quality separation of the object downmix signal into several audio objects, where this operation is also termed to be an object upmix operation which is performed by the processor 10 in FIG. 1 as discussed earlier.

The object downmix signal 52 is preferably generated by an object downmixer 101*a*. The parametric data 54 is preferably generated by an object parameter calculator 101*b*, and the object-selective metadata 53 is generated by an object-selective metadata provider 55. The object-selective metadata provider may be an input for receiving metadata as generated by an audio producer within a sound studio or may be data generated by an object-related analysis, which could be performed subsequent to the object separation. Specifically, the object-selective metadata provider could be implemented to analyze the object's output by the processor 10 in order to, for example, find out whether an object is a speech object, a sound object or a surround sound object. Thus, a speech object could be analyzed by some of the well-known speech detection algorithms known from speech coding, and the object-selective analysis could be implemented to also find out sound objects, stemming from instruments. Such sound objects have a high tonal nature and can, therefore, be distinguished from speech objects or surround sound objects. Surround sound objects will have a quite noisy nature reflecting the background sound which typically exists in, for example, cinema movies, where, for example, background noises are traffic sounds or any other stationary noisy signals or non-stationary signals having a broadband spectrum such as it is generated when, for example, a shooting scene takes place in a cinema.

Based on this analysis, one could amplify a sound object and attenuate the other objects in order to emphasize the speech as it is useful for a better understanding of the movie for hearing-impaired people or for elder people. As stated before, other implementations include the provision of the object-specific metadata such as an object identification and the object-related data by a sound engineer generating the actual object downmix signal on a CD or a DVD such as a stereo downmix or a surround sound downmix.

FIG. 5*d* illustrates an exemplary data stream 50, which has, as main information, the mono, stereo or multichannel object downmix and which has, as side information, the object parameters 54 and the object based metadata 53, which are stationary in the case of only identifying objects as speech or surround, or which are time-variable in the case of the provision of level data as object based metadata such as required by the midnight mode. Preferably, however, the object based metadata are not provided in a frequency-selective way in order to save data rate.

FIG. 6 illustrates an embodiment of an audio object map illustrating a number of N objects. In the exemplary explanation of FIG. 6, each object has an object ID, a corresponding object audio file and, importantly, audio object parameter information which is, preferably, information relating to the energy of the audio object and to the inter-object correlation of the audio object. Specifically, the audio object parameter information includes an object co-variance matrix E for each subband and for each time block.

An example for such an object audio parameter information matrix E is illustrated in FIG. 7. The diagonal elements $e_{11}$ include power or energy information of the audio object i in the corresponding subband and the corresponding time block. To this end, the subband signal representing a certain audio object i is input into a power or energy calculator which may, for example, perform an auto correlation function (acf)

to obtain value $e_{11}$ with or without some normalization. Alternatively, the energy can be calculated as the sum of the squares of the signal over a certain length (i.e. the vector product: ss*). The acf can in some sense describe the spectral distribution of the energy, but due to the fact that a T/F-transform for frequency selection is preferably used anyway, the energy calculation can be performed without an acf for each subband separately. Thus, the main diagonal elements of object audio parameter matrix E indicate a measure for the power of energy of an audio object in a certain subband in a certain time block.

On the other hand, the off-diagonal element $e_{ij}$ indicate a respective correlation measure between audio objects i, j in the corresponding subband and time block. It is clear from FIG. 7 that matrix E is—for real valued entries—symmetric with respect to the main diagonal. Generally, this matrix is a Hermitian matrix. The correlation measure element $e_{ij}$ can be calculated, for example, by a cross correlation of the two subband signals of the respective audio objects so that a cross correlation measure is obtained which may or may not be normalized. Other correlation measures can be used which are not calculated using a cross correlation operation but which are calculate by other ways of determining correlation between two signals. For practical reasons, all elements of matrix E are normalized so that they have magnitudes between 0 and 1, where 1 indicates a maximum power or a maximum correlation and 0 indicates a minimum power (zero power) and −1 indicates a minimum correlation (out of phase).

The downmix matrix D of size K×N where K>1 determines the K channel downmix signal in the form of a matrix with K rows through the matrix multiplication $$X=DS. \tag{2}$$

FIG. 8 illustrates an example of a downmix matrix D having downmix matrix elements Such an element $d_{ij}$ indicates whether a portion or the whole object j is included in the object downmix signal i or not. When, for example, $d_{12}$ is equal to zero, this means that object 2 is not included in the object downmix signal 1. On the other hand a value of $d_{23}$ equal to 1 indicates that object 3 is fully included in object downmix signal 2.

Values of downmix matrix elements between 0 and 1 are possible. Specifically, the value of 0.5 indicates that a certain object is included in a downmix signal, but only with half its energy. Thus, when an audio object such object number 4 is equally distributed to both downmix signal channels, then $d_{24}$ and $d_{14}$ would be equal to 0.5. This way of downmixing is an energy-conserving downmix operation which is preferred for some situations. Alternatively, however, a non-energy conserving downmix can be used as well, in which the whole audio object is introduced into the left downmix channel and the right downmix channel so that the energy of this audio object has been doubled with respect to the other audio objects within the downmix signal.

At the lower portion of FIG. 8, a schematic diagram of the object encoder 101 of FIG. 1 is given. Specifically, the object encoder 101 includes two different portions 101*a* and 101*b*. Portion 101*a* is a downmixer which preferably performs a weighted linear combination of audio objects 1, 2, . . . , N, and the second portion of the object encoder 101 is an audio object parameter calculator 101*b*, which calculates the audio object parameter information such as matrix E for each time block or subband in order to provide the audio energy and correlation information which is a parametric information and can, therefore, be transmitted with a low bit rate or can be stored consuming a small amount of memory resources.

The user controlled object rendering matrix A of size M×N determines the M channel target rendering of the audio objects in the form of a matrix with M rows through the matrix multiplication $$Y=AS. \tag{3}$$

It will be assumed throughout the following derivation that M=2 since the focus is on stereo rendering. Given an initial rendering matrix to more than two channels, and a downmix rule from those several channels into two channels it is obvious for those skilled in the art to derive the corresponding rendering matrix A of size 2×N for stereo rendering. It will also be assumed for simplicity that K=2 such that the object downmix is also a stereo signal. The case of a stereo object downmix is furthermore the most important special case in terms of application scenarios.

FIG. 9 illustrates a detailed explanation of the target rendering matrix A. Depending on the application, the target rendering matrix A can be provided by the user. The user has full freedom to indicate, where an audio object should be located in a virtual manner for a replay setup. The strength of the audio object concept is that the downmix information and the audio object parameter information is completely independent on a specific localization of the audio objects. This localization of audio objects is provided by a user in the form of target rendering information. Preferably, the target rendering information can be implemented as a target rendering matrix A which may be in the form of the matrix in FIG. 9. Specifically, the rendering matrix A has M lines and N columns, where M is equal to the number of channels in the rendered output signal, and wherein N is equal to the number of audio objects. M is equal to two of the preferred stereo rendering scenario, but if an M-channel rendering is performed, then the matrix A has M lines.

Specifically, a matrix element $a_{ij}$, indicates whether a portion or the whole object j is to be rendered in the specific output channel i or not. The lower portion of FIG. 9 gives a simple example for the target rendering matrix of a scenario, in which there are six audio objects AO1 to AO6 wherein only the first five audio objects should be rendered at specific positions and that the sixth audio object should not be rendered at all.

Regarding audio object AO1, the user wants that this audio object is rendered at the left side of a replay scenario. Therefore, this object is placed at the position of a left speaker in a (virtual) replay room, which results in the first column of the rendering matrix A to be (10). Regarding the second audio object, $a_{22}$ is one and $a_{12}$ is 0 which means that the second audio object is to be rendered on the right side.

Audio object 3 is to be rendered in the middle between the left speaker and the right speaker so that 50% of the level or signal of this audio object go into the left channel and 50% of the level or signal go into the right channel so that the corresponding third column of the target rendering matrix A is (0.5 length 0.5).

Similarly, any placement between the left speaker and the right speaker can be indicated by the target rendering matrix. Regarding audio object 4, the placement is more to the right side, since the matrix element $a_{24}$ is larger than $a_{14}$. Similarly, the fifth audio object A05 is rendered to be more to the left speaker as indicated by the target rendering matrix elements $a_{15}$ and $a_{25}$. The target rendering matrix A additionally allows to not render a certain audio object at all. This is exemplarily illustrated by the sixth column of the target rendering matrix A which has zero elements.

Subsequently, a preferred embodiment of the present invention is summarized referencing to FIG. 10.

Preferably, the methods known from SAOC (Spatial Audio Object Coding) split up one audio signal into different parts. These parts may be for example different sound objects, but it might not be limited to this.

If the metadata is transmitted for each single part of the audio signal, it allows adjusting just some of the signal components while other parts will remain unchanged or even might be modified with different metadata.

This might be done for different sound objects, but also for individual spectral ranges.

Parameters for object separation are classical or even new metadata (gain, compression, level, . . . ), for every individual audio object. These data are preferably transmitted.

The decoder processing box is implemented in two different stages: In a first stage, the object separation parameters are used to generate (10) individual audio objects. In the second stage, the processing unit 13 has multiple instances, where each instance is for an individual object. Here, the object-specific metadata should be applied. At the end of the decoder, all individual objects are again combined (16) to one single audio signal. Additionally, a dry/wet-controller 20 may allow smooth fade-over between original and manipulated signal to give the end-user a simple possibility to find her or his preferred setting.

Figure 10:
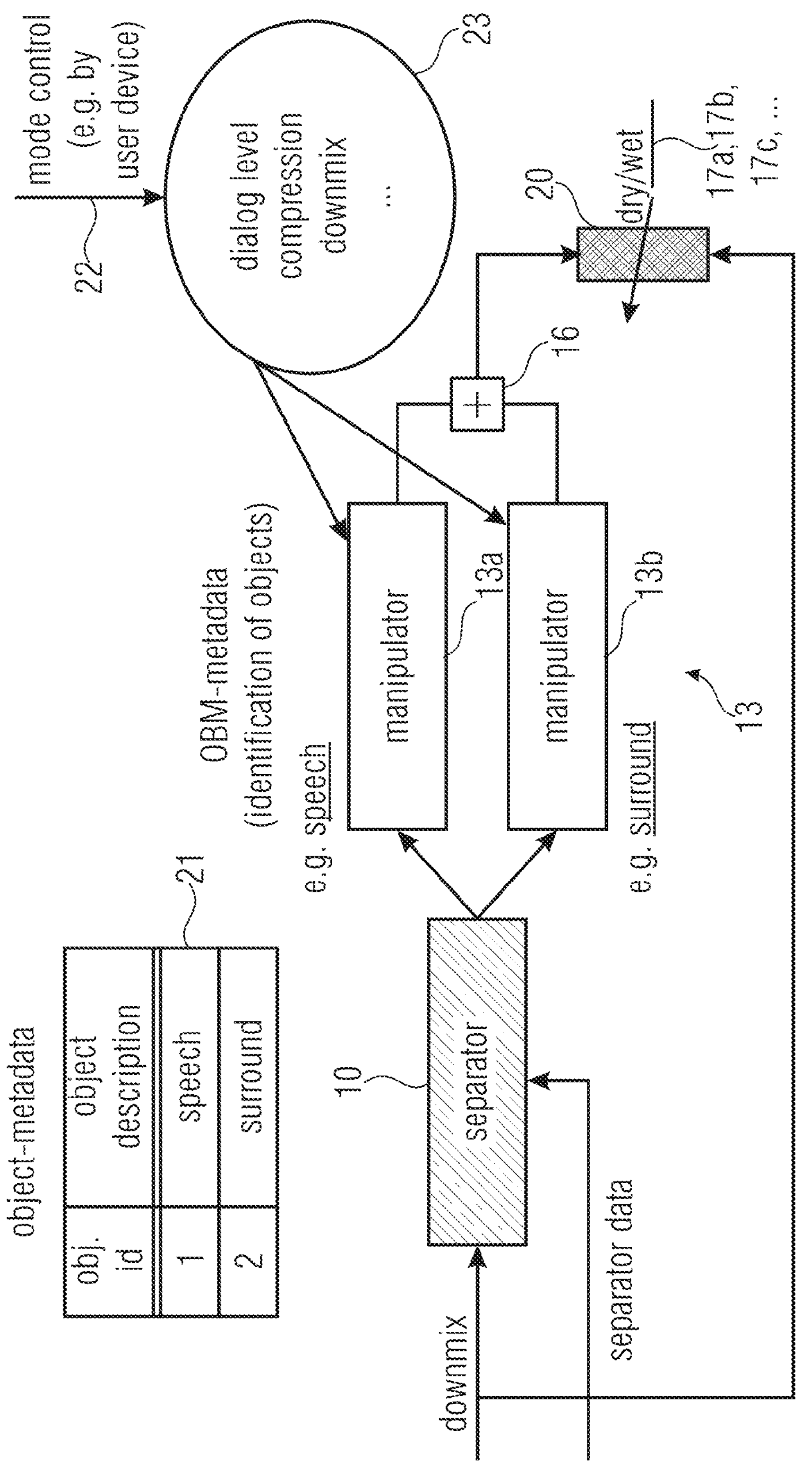
FIG. 10 illustrates a preferred embodiment of an apparatus for genereting at least one audio output signal in accordance with a further aspect of the present invention.

Depending on the specific implementation, FIG. 10 illustrates two aspects. In a base aspect, the object-related metadata are just indicating an object description for a specific object. Preferably, the object description is related to an object ID as indicated at 21 in FIG. 10. Therefore, the object based metadata for the upper object manipulated by device 13*a* is just the information that this object is a "speech" object. The object based metadata for the other object processed by item 13*b* have information that this second object is a surround object.

This basic object-related metadata for both objects might be sufficient for implementing an enhanced clean audio mode, in which the speech object is amplified and the surround object is attenuated or, generally speaking, the speech object is amplified with respect to the surround object or the surround object is attenuated with respect to the speech object. The user, however, can preferably implement different processing modes on the receiver/decoder-side, which can be programmed via a mode control input. These different modes can be a dialogue level mode, a compression mode, a downmix mode, an enhanced midnight mode, an enhanced clean audio mode, a dynamic downmix mode, a guided upmix mode, a mode for relocation of objects etc.

Depending on the implementation, the different modes require a different object based metadata in addition to the basic information indicating the kind or characteristic of an object such as speech or surround. In the midnight mode, in which the dynamic range of an audio signal has to be compressed, it is preferred that, for each object such as speech object and the surround object, either the actual level or the target level for the midnight mode is provided as metadata. When the actual level of the object is provided, then the receiver has to calculate the target level for the midnight mode. When, however, the target relative level is given, then the decoder/receiver-side processing is reduced.

In this implementation, each object has a time-varying object based sequence of level information which are used by a receiver to compress the dynamic range so that the level differences within a single object are reduced. This, automatically, results in a final audio signal, in which the level differences from time to time are reduced as required by a midnight mode implementation. For clean audio applications, a target level for the speech object can be provided as well. Then, the surround object might be set to zero or almost to zero in order to heavily emphasize the speech object within the sound generated by a certain loudspeaker setup. In a high fidelity application, which is the contrary of the midnight mode, the dynamic range of the object or the dynamic range of the difference between the objects could even be enhanced. In this implementation, it would be preferred to provide target object gain levels, since these target levels guarantee that, in the end, a sound is obtained which is created by an artistic sound engineer within a sound studio and, therefore, has the highest quality compared to an automatic or user defined setting.

In other implementations, in which the object based metadata relate to advanced downmixes, the object manipulation includes a downmix different from for specific rendering setups. Then, the object based metadata is introduced into the object downmixer blocks 19*a* to 19*c* in FIG. 3*b* or FIG. 4. In this implementation, the manipulator may include blocks 19*a* to 19*c*, when an individual object downmix is performed depending on the rendering setup. Specifically, the object downmix blocks 19*a* to 19*c* can be set different from each other. In this case, a speech object might be introduced only into the center channel rather than in a left or right channel, depending on the channel configuration. Then, the downmixer blocks 19*a* to 19*c* might have different numbers of component signal outputs. The downmix can also be implemented dynamically.

Additionally, guided upmix information and information for relocation of objects can be provided as well.

Subsequently, a summary of preferred ways of providing metadata and the application of object-specific metadata is given.

Audio objects may not be separated ideally like in typical SOAC application. For manipulation of audio, it may be sufficient to have a "mask" of the objects, not a total separation.

This could lead to less/coarser parameters for object separation.

For the application called "midnight mode", the audio engineer needs to define all metadata parameters independently for each object, yielding for example in constant dialog volume but manipulated ambience noise ("enhanced midnight mode").

This may be also useful for people wearing hearing aids ("enhanced clean audio").

New downmix scenarios: Different separated objects may be treated different for each specific downmix situation. For example, a 5.1-channel signal must be downmixed for a stereo home television system and another receiver has even only a mono playback system. Therefore, different objects may be treated in different ways (and all this is controlled by the sound engineer during production due to the metadata provided by the sound engineer).

Also downmixes to 3.0, etc. are preferred.

The generated downmix will not be defined by a fixed global parameter (set), but it may be generated from time-varying object dependent parameters.

With new object based metadata, it is possible to perform a guided upmix as well.

Objects may be placed to different positions, e.g. to make the spatial image broader when ambience is attenuated. This will help speech intelligibility for hearing-disabled people.

The proposed method in this paper extends the existing metadata concept implemented and mainly used in Dolby Codecs. Now, it is possible to apply the known metadata concept not only to the whole audio stream, but to extracted objects within this stream. This gives audio engineers and artists much more flexibility, greater ranges of adjustments and therefore better audio quality and enjoyment for the listeners.

Figure 12A:
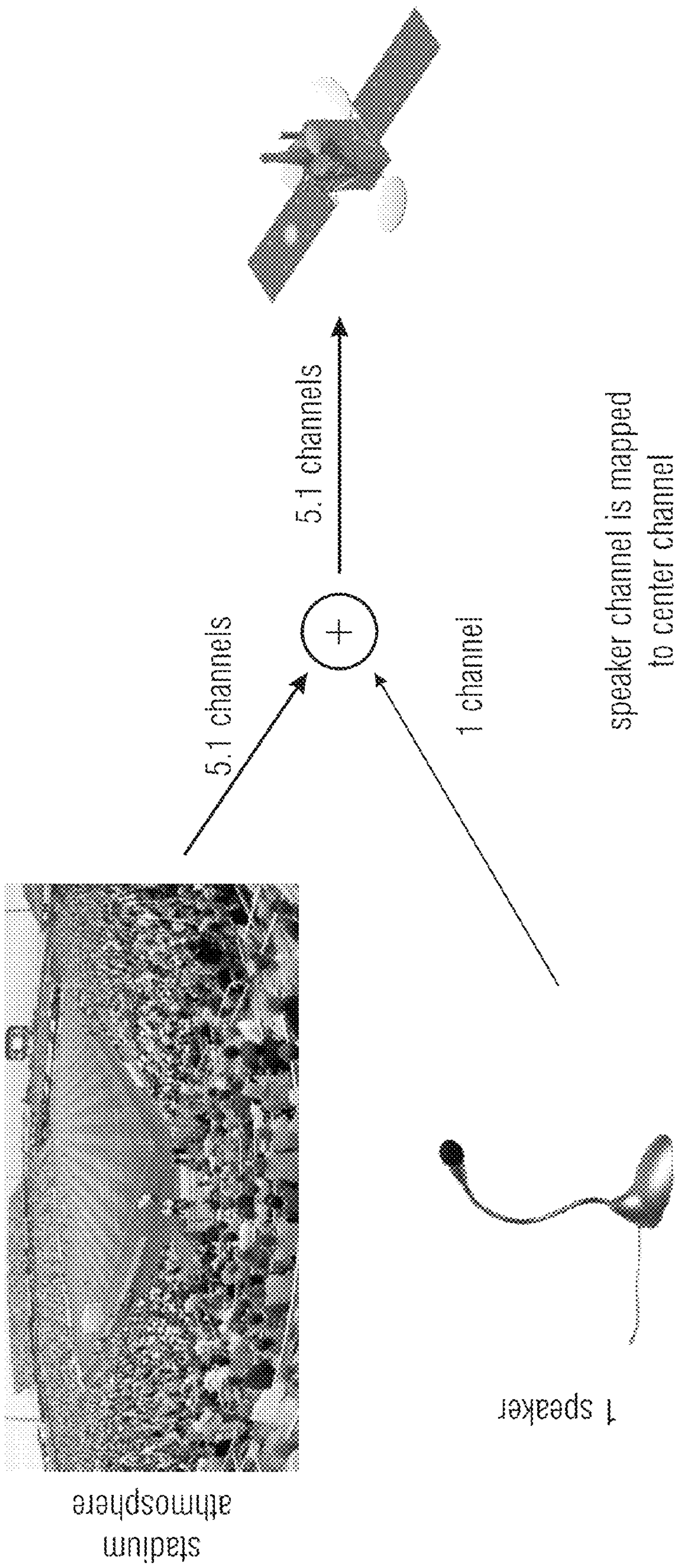
FIG. 12*a* illustrates an exemplary application scenario.
Figure 12B:
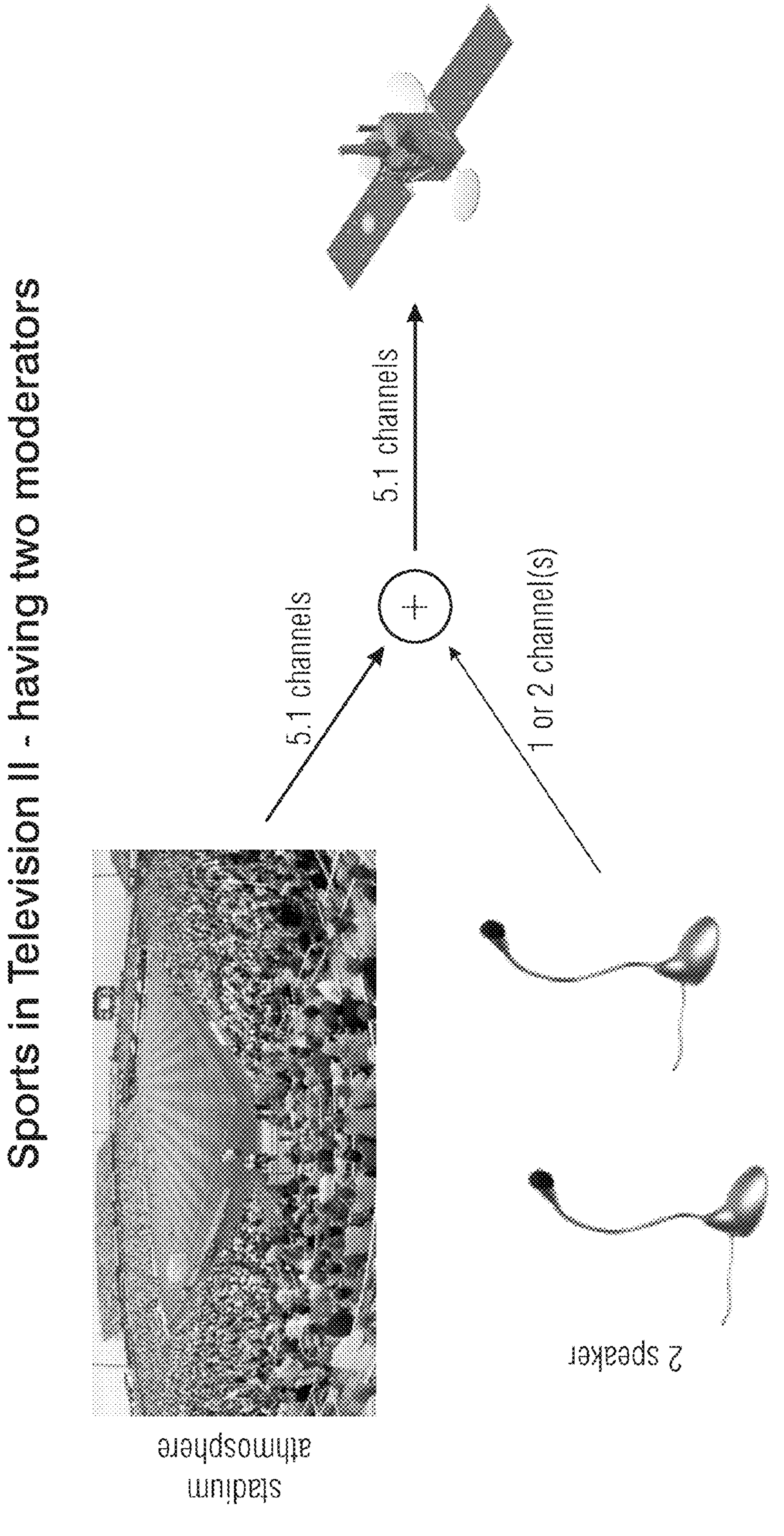
FIG. 12*b* illustrates a further exemplary application scenario.

FIGS. 12*a*, 12*b* illustrate different application scenarios of the inventive concept. In a classical scenario, there exists sports in television, where one has the stadium atmosphere in all 5.1 channels, and where the speaker channel is mapped to the center channel. This "mapping" can be performed by a straight-forward addition of the speaker channel to a center channel existing for the 5.1 channels carrying the stadium atmosphere. Now, the inventive process allows to have such a center channel in the stadium atmosphere sound description. Then, the addition operation mixes the center channel from the stadium atmosphere and the speaker. By generating object parameters for the speaker and the center channel from the stadium atmosphere, the present invention allows to separate these two sound objects on a decoder-side and allows to enhance or attenuate the speaker or the center channel from the stadium atmosphere. The further scenario is, when one has two speakers. Such a situation may arise, when two persons are commenting one and the same soccer game. Specifically, when there exist two speakers which are speaking simultaneously, it might be useful to have these two speakers as separate objects and, additionally, to have these two speakers separate from the stadium atmosphere channels. In such an application, the 5.1 channels and the two speaker channels can be processed as eight different audio objects or seven different audio objects, when the low frequency enhancement channel (sub-woofer channel) is neglected. Since the straight-forward distribution infrastructure is adapted to a 5.1 channels sound signal, the seven (or eight) objects can be downmixed into a 5.1 channels downmix signal, and the object parameters can be provided in addition to the 5.1 downmix channels so that, on the receiver side, the objects can be separated again and due to the fact that object based metadata will identify the speaker objects from the stadium atmosphere objects, an object-specific processing is possible, before a final 5.1 channels downmix by the object mixer takes place on the receiver side.

In this scenario, one could also have a first object comprising the first speaker, a second object comprising the second speaker and a third object comprising the complete stadium atmosphere.

Subsequently, different implementations of object based downmix scenarios are discussed in the context of FIGS. 11*a* to 11*c*.

When, for example, the sound generated by the FIG. 12*a* or 12*b* scenario has to be replayed on a conventional 5.1 playback system, then the embedded metadata stream can be disregarded and the received stream can be played as it is. When, however, a playback has to take place on stereo speaker setups, a downmix from 5.1 to stereo has to take place. If the surround channels are just added to left/right, the moderators may be at level that is too small. Therefore, it is preferred to reduce the atmosphere level before or after downmix before the moderator object is (re-) added.

Hearing impaired people may want to reduce the atmosphere level to have better speech intelligibility while still having both speakers separated in left/right, which is known as the "cocktail-party-effect", where one hears her or his name and then, concentrates into the direction where she or he heard her or his name. This direction-specific concentration will, from a psycho acoustic point of view attenuate the sound coming from different directions. Therefore, a sharp location of a specific object such as the speaker on left or right or on both left or right so that the speaker appears in the middle between left or right might increase intelligibility. To this end, the input audio stream is preferably divided into separate objects, where the objects have to have a ranking in metadata saying that an object is important or less important. Then, the level difference between them can be adjusted in accordance with the meta data or the object position can be relocated to increase intelligibility in accordance with the metadata.

To obtain this goal, metadata are applied not on the transmitted signal but metadata are applied to single separable audio objects before or after the object downmix as the case may be. Now, the present invention does not require anymore that objects have to be limited to spatial channels so that these channels can be individually manipulated. Instead, the inventive object based metadata concept does not require to have a specific object in a specific channel, but objects can be downmixed to several channels and can still be individually manipulated.

Figure 11A:
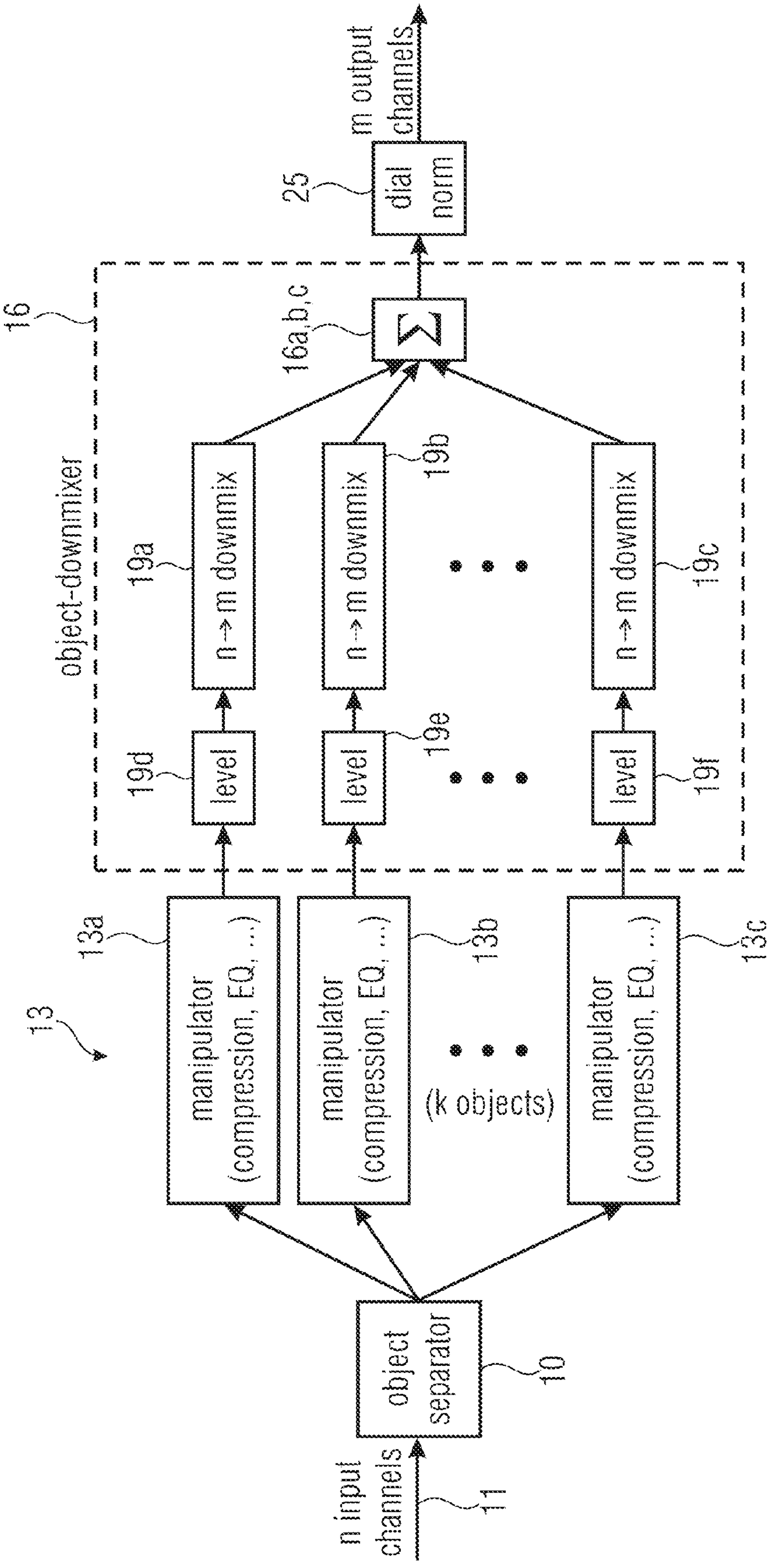
FIG. 11*a* illustrates a further embodiment.

FIG. 11*a* illustrates a further implementation of a preferred embodiment. The object downmixer 16 generates m output channels out of k×n input channels, where k is the number of objects and were n channels are generated per object. FIG. 11*a* corresponds to the scenario of FIG. 3*a*, 3*b*, where the manipulation 13*a*, 13*b*, 13*c* takes place before the object downmix.

FIG. 11*a* furthermore comprises level manipulators 19*d*, 19*e*, 19*f*, which can be implemented without a metadata control. Alternatively, however, these level manipulators can be controlled by object based metadata as well so that the level modification implemented by blocks 19*d* to 19*f* is also part of the object manipulator 13 of FIG. 1. The same is true for the downmix operations 19*a* to 19*b* to 19*c*, when these downmix operations are controlled by the object based metadata. This case, however, is not illustrated in FIG. 11*a*, but could be implemented as well, when the object based metadata are forwarded to the downmix blocks 19*a* to 19*c* as well. In the latter case, these blocks would also be part of the object manipulator 13 of FIG. 11*a*, and the remaining functionality of the object mixer 16 is implemented by the output-channel-wise combination of the manipulated object component signals for the corresponding output channels. FIG. 11*a* furthermore comprises a dialogue normalization functionality 25, which may be implemented with conventional metadata, since this dialogue normalization does not take place in the object domain but in the output channel domain.

Figure 11B:
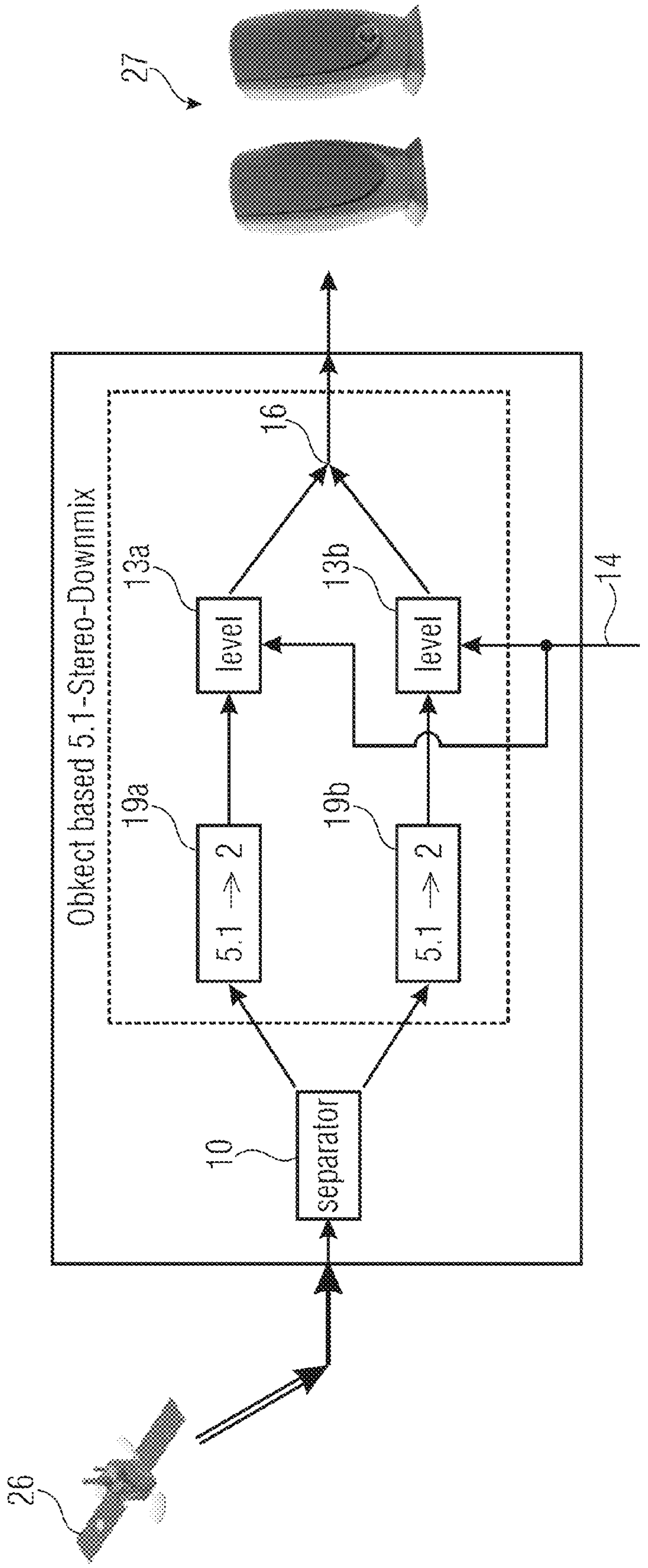
FIG. 11*b* illustrates an even further embodiment.

FIG. 11*b* illustrates an implementation of an object based 5.1-stereo-downmix. Here, the downmix is performed before manipulation and, therefore, FIG. 11*b* corresponds to the scenario of FIG. 4. The level modification 13*a*, 13*b* is performed by object based metadata where, for example, the upper branch corresponds to a speech object and the lower branch corresponds to a surround object or, for the example in FIG. 12*a*, 12*b*, the upper branch corresponds to one or both speakers and the lower branch corresponds to all surround information. Then, the level manipulator blocks 13*a*, 13*b* would manipulate both objects based on fixedly set parameters so that the object based metadata would just be an identification of the objects, but the level manipulators 13*a*, 13*b* could also manipulate the levels based on target levels provided by the metadata 14 or based on actual levels provided by the metadata 14. Therefore, to generate a stereo downmix for multichannel input, a downmix formula for each object is applied and the objects are weighted by a given level before remixing them to an output signal again.

Figure 11C:
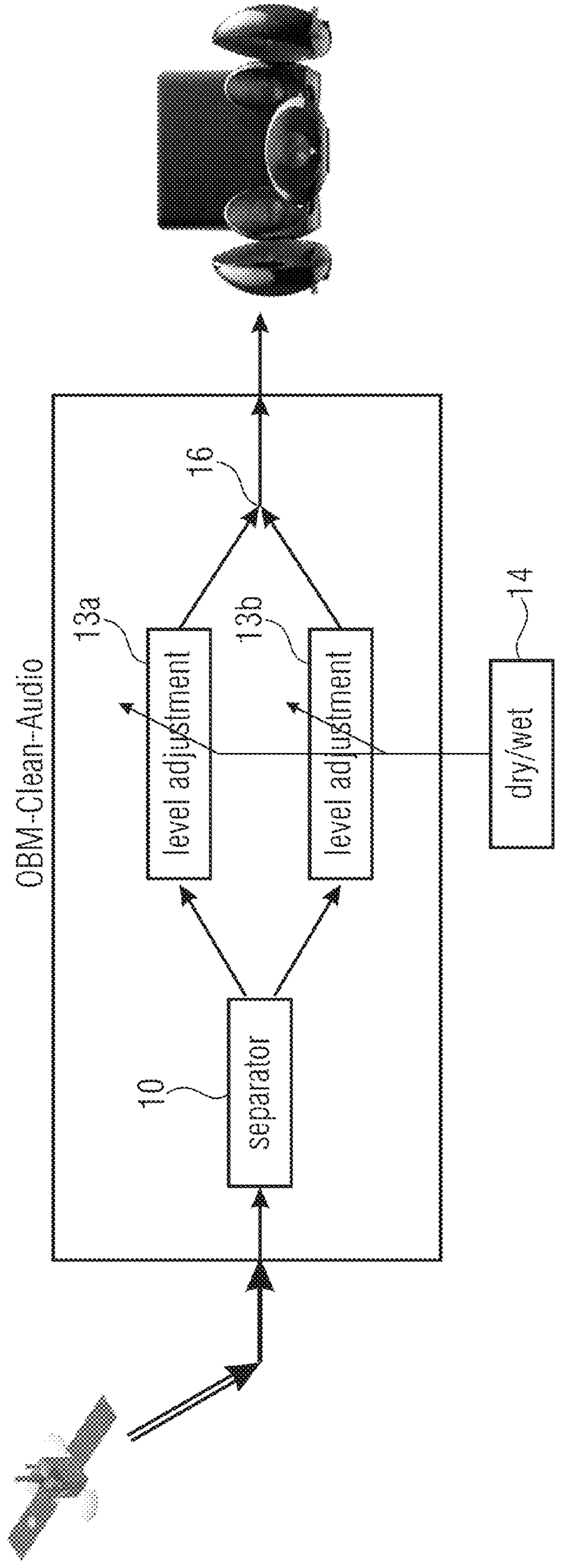
FIG. 11*c* illustrates a further embodiment.

For clean audio applications as illustrated in FIG. 11*c*, an importance level is transmitted as metadata to enable a reduction of less important signal components. Then, the other branch would correspond to the importance components, which are amplified while the lower branch might correspond to the less important components which can be attenuated. How the specific attenuation and/or amplification of the different objects is performed can be fixedly set by a receiver but can also be controlled, in addition, by object based metadata as implemented by the "dry/wet" control 14 in FIG. 11*c*.

Generally, a dynamic range control can be performed in the object domain which is done similar to the AAC-dynamic range control implementation as a multi-band compression. The object based metadata can even be a frequency-selective data so that a frequency-selective compression is performed which is similar to an equalizer implementation.

As stated before, a dialogue normalization is preferably performed subsequent to the downmix, i.e., in the downmix signal. The downmixing should, in general, be able to process k objects with n input channels into m output channels.

It is not necessarily important to separate objects into discrete objects. It may be sufficient to "mask out" signal components which are to be manipulated. This is similar to editing masks in image processing. Then, a generalized "object" is a superposition of several original objects, where this superposition includes a number of objects which is smaller than the total number of original objects. All objects are again added up at a final stage. There might be no interest in separated single objects, and for some objects, the level value may be set to 0, which is a high negative dB figure, when a certain object has to be removed completely such as for karaoke applications where one might be interested in completely removing the vocal object so that the karaoke singer can introduce her or his own vocals to the remaining instrumental objects.

Other preferred applications of the invention are as stated before an enhanced midnight mode where the dynamic range of single objects can be reduced, or a high fidelity mode, where the dynamic range of objects is expanded. In this context, the transmitted signal may be compressed and it is intended to invert this compression. The application of a dialogue normalization is mainly preferred to take place for the total signal as output to the speakers, but a non-linear attenuation/amplification for different objects is useful, when the dialogue normalization is adjusted. In addition to parametric data for separating the different audio objects from the object downmix signal, it is preferred to transmit, for each object and sum signal in addition to the classical metadata related to the sum signal, level values for the downmix, importance an importance values indicating an importance level for clean audio, an object identification, actual absolute or relative levels as time-varying information or absolute or relative target levels as time-varying information etc.

The described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with programmable computer systems such that the inventive methods are performed. Generally, the present invention is therefore a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer.

REFERENCES

[1] ISO/IEC 13818-7: MPEG-2 (Generic coding of moving pictures and associated audio information)—Part 7: Advanced Audio Coding (AAC)

[2] ISO/IEC 23003-1: MPEG-D (MPEG audio technologies)—Part 1: MPEG Surround

[3] ISO/IEC 23003-2: MPEG-D (MPEG audio technologies)—Part 2: Spatial Audio Object Coding (SAOC)

[4] ISO/IEC 13818-7: MPEG-2 (Generic coding of moving pictures and associated audio information)—Part 7: Advanced Audio Coding (AAC)

[5] ISO/IEC 14496-11: MPEG 4 (Coding of audio-visual objects)—Part 11: Scene Description and Application Engine (BIFS)

[6] ISO/IEC 14496-: MPEG 4 (Coding of audio-visual objects)—Part 20: Lightweight Application Scene Representation (LASER) and Simple Aggregation Format (SAF)

[7] http:/www.dolby.com/assets/pdf/techlibrary/17. All-Metadata.pdf

[8] http:/www.dolby.com/assets/pdf/tech_library/18_Metadata.Guide.pdf

[9] Krauss, Kurt; Roden, Jonas; Schildbach, Wolfgang: Transcoding of Dynamic Range Control Coefficients and Other Metadata into MPEG-4 HE AA, AES convention 123, October 2007, pp 7217

[10] Robinson, Charles Q., Gundry, Kenneth: Dynamic Range Control via Metadata, AES Convention 102, September 1999, pp 5028

[11] Dolby, "Standards and Practices for Authoring Dolby Digital and Dolby E Bitstreams", Issue 3

[14] Coding Technologies/Dolby, "Dolby E/aacPlus Metadata Transcoder Solution for aacPlus Multichannel Digital Video Broadcast (DVB)", V1.1.0

[15] ETSI TS101154: Digital Video Broadcasting (DVB), V1.8.1

[16] SMPTE RDD 6-2008: Description and Guide to the Use of Dolby E audio Metadata Serial Bitstream

The invention claimed is:

1. Apparatus for generating at least one audio output signal representing a superposition of at least two different audio objects, the at least two different audio objects comprising a first audio object and a second audio object, the apparatus comprising:

a processor arranged to process an audio input signal, the audio input signal being an object downmix comprising the first audio object and the second audio object, to provide an object representation of the audio input signal, in which the first audio object and the second audio object are separated from each other, in which the first audio object and the second audio object are available as a first audio object signal and a separate second audio object signal, and in which the first audio object signal and the second audio object signal are manipulatable independently from each other;

an object manipulator arranged to manipulate the first audio object signal based on audio object based metadata referring to the first audio object to obtain a manipulated first audio object signal for the first audio object; and an object mixer arranged to combine the manipulated first audio object signal with the second audio object signal, the second audio object signal not being manipulated by the object manipulator or arranged to combine the manipulated first audio object signal with a manipulated second audio object signal, the manipulated second audio object signal being manipulated by the object manipulator based on audio object based metadata referring to the second audio object in a different way as compared to the manipulated first audio object signal.

2. Apparatus in accordance with claim 1, in which the audio input signal is a downmixed representation of a plurality of original audio objects comprising the first audio object and the second audio object and comprises, as side information, object based metadata having information on one or more original audio objects of the plurality of original audio objects included in the downmixed representation, and in which the object manipulator is adapted to extract the object based metadata from the audio input signal.

3. Apparatus in accordance with claim 1, in which the metadata comprises information on a gain, a compression, a level, a downmix setup or a characteristic specific for a certain object, and wherein the object manipulator is adaptive to manipulate the object or other objects based on the metadata to implement, in an object specific way, a midnight mode, a high fidelity mode, a clean audio mode, a dialogue normalization, a downmix specific manipulation, a dynamic downmix, a guided upmix, a relocation of speech objects or an attenuation of an ambience object.

4. Method of generating at least one audio output signal representing a superposition of at least two different audio objects, the at least two different audio objects comprising a first audio object and a second audio object, the method comprising:

processing an audio input signal, the audio input signal being an object downmix comprising the first audio object and the second audio object, to provide an object representation of the audio input signal, in which the first audio object and the second audio object are separated from each other, in which the first audio object and the second audio object are available as a first audio object signal and a separate second audio object signal, and in which the first audio object signal and the second audio object signal are manipulatable independently from each other;

manipulating the first audio object signal based on audio object based metadata referring to the first audio object to obtain a manipulated first audio object signal for the first audio object; and combining the manipulated first audio object signal with the second audio object signal, the second audio object signal not being manipulated by the manipulating; or combining the manipulated first audio object signal with a manipulated second audio object signal, the manipulated second audio object signal being manipulated by the manipulating based on audio object based metadata referring to the second audio object in a different way compared to the manipulated first audio object signal.

5. A non-transitory computer readable medium storing a computer program for performing, when being executed on a computer, a method for generating at least one audio output signal in accordance with claim 4.

6. Apparatus for generating at least one audio output signal representing a superposition of at least two different audio objects, the at least two different audio objects comprising a first audio object and a second audio object, the apparatus comprising:

a processor arranged to process an audio input signal to provide an object representation of the audio input signal, in which the first audio object and the second audio object are separated from each other, in which the first audio object and the second audio object are available as a first audio object signal and a separate second audio object signal, and in which the first audio object signal and the second audio object signal are manipulatable independently from each other;

a first object downmixer arranged to distribute the first audio object signal into output channels using rendering information to obtain a first plurality of first object component signals;

a second object downmixer arranged to distribute the second audio object signal into the output channels using the rendering information to obtain a second plurality of second object component signals;

an object manipulator arranged to manipulate each of the first object component signals of the first plurality in a same manner based on audio object based metadata referring to the first audio object to obtain manipulated first object component signals for the first audio object, and an object mixer arranged to add, per output channel, the manipulated first object component signals with the second object component signals not being manipulated by the object manipulator or arranged to add, per output channel, the manipulated first object component signals with manipulated second object component signals, the manipulated second object component signals being manipulated by the object manipulator in a same manner based on audio object based metadata referring to the second audio object, the manipulated second object component signals being manipulated in a different way compared to the manipulated first object component signals.

7. Method of generating at least one audio output signal representing a superposition of at least two different audio objects, the at least two different audio objects comprising a first audio object and a second audio object, the method comprising:

processing an audio input signal to provide an object representation of the audio input signal, in which the first audio object and the second audio object are separated from each other, in which the first audio object and the second audio object are available as a first audio object signal and a separate second audio object signal, and in which the first audio object signal and the second audio object signal are manipulatable independently from each other;

distributing the first audio object signal into output channels using rendering information to obtain a first plurality of first object component signals;

distributing the second audio object signal into the output channels using the rendering information to obtain a second plurality of second object component signals;

manipulating each of the first object component signals of the first plurality in a same manner based on audio object based metadata referring to the first audio object to obtain manipulated first object component signals for the first audio object; and adding, per output channel, the manipulated first object component signals with the second object component signals not being manipulated by the manipulating, or adding, per output channel, the manipulated first object component signals with manipulated second object component signals, the manipulated second object component signals being manipulated by the manipulating in a same manner based on audio object based metadata referring to the second audio object, the manipulated second object component signals being manipulated in a different way compared to the manipulated first object component signals.

8. A non-transitory computer readable medium storing a computer program for performing, when being executed on a computer, a method for generating at least one audio output signal in accordance with claim 7.

* * * * *